United States Patent
Chamberlain et al.

(10) Patent No.: US 9,626,448 B2
(45) Date of Patent: *Apr. 18, 2017

(54) SYSTEM AND/OR METHOD FOR LINKING NETWORK CONTENT

(71) Applicants: Robin Daniel Chamberlain, Melbourne (AU); Hamish Charles Robertson, Northcote (AU)

(72) Inventors: Robin Daniel Chamberlain, Melbourne (AU); Hamish Charles Robertson, Northcote (AU)

(*) Notice: Subject to any disclaimer, the term of this patent is extended or adjusted under 35 U.S.C. 154(b) by 0 days.

This patent is subject to a terminal disclaimer.

(21) Appl. No.: 14/918,593

(22) Filed: Oct. 21, 2015

(65) Prior Publication Data

US 2016/0055255 A1    Feb. 25, 2016

Related U.S. Application Data

(63) Continuation of application No. 13/035,885, filed on Feb. 25, 2011, now Pat. No. 9,177,322, which is a (Continued)

(30) Foreign Application Priority Data

Aug. 27, 2008 (AU) .............................. 2008904357

(51) Int. Cl.
    *G06F 17/30*      (2006.01)
    *G06Q 30/02*      (2012.01)
    *G06F 3/0484*      (2013.01)

(52) U.S. Cl.
    CPC .... *G06F 17/30887* (2013.01); *G06F 3/04842* (2013.01); *G06F 17/30864* (2013.01);
(Continued)

(58) Field of Classification Search
    USPC .................................................. 707/726, 803
    See application file for complete search history.

(56) References Cited

U.S. PATENT DOCUMENTS

| | | |
|---|---|---|
| 5,008,853 A | 4/1991 | Bly et al. |
| 5,021,949 A | 6/1991 | Morten |

(Continued)

FOREIGN PATENT DOCUMENTS

| | | |
|---|---|---|
| AU | 2007901872 | 4/2007 |
| WO | 9734244 A1 | 9/1997 |

(Continued)

OTHER PUBLICATIONS

International Preliminary Report of Patentability dated Jul. 14, 2008 in PCT/AU2008/000505.

(Continued)

*Primary Examiner* — Hanh Thai
(74) *Attorney, Agent, or Firm* — Henry J. Cittone; Cittone & Chinta LLP

(57) ABSTRACT

The present invention provides a system (10) for linking network content (12$_n$) over a communications network (14$_n$). The system (10) including: at least one memory or storage unit (20$_n$) operable to store and/or maintain a plurality of linked-content facilities (30$_n$), each of the linked-content facilities (30$_n$) being independently associated with a network location that contains network content (12$_n$); at least one processor operable to execute software that generates, maintains and/or controls access to the linked-content facilities (30$_n$) for a plurality of users (24$_n$); and, at least one input/output device (22$_n$) operable to provide an interface for the users (24$_n$) to operate the software in order to retrieve and/or view the linked-content facilities (30$_n$) for selected network locations from the memory or storage unit (20$_n$), via the communications network (14$_n$). Wherein the linked-content facilities (30$_n$) stored and/or maintained on the
(Continued)

memory or storage unit ($20_n$) include system generated link content ($32_n,32A_n$), and/or user generated link content ($32_n$, $32A_n$) received from at least one user ($24_n$), regarding network content ($12_n$) related to the respective network locations. The present invention also provides associated methods (100) for linking network content ($12_n$) for use with the system (10) of the invention.

45 Claims, 11 Drawing Sheets

Related U.S. Application Data continuation of application No. PCT/AU2009/001108, filed on Aug. 27, 2009.

(52) U.S. Cl.
CPC .. *G06F 17/30867* (2013.01); *G06F 17/30882* (2013.01); *G06F 17/30905* (2013.01); *G06Q 30/02* (2013.01)

(56) References Cited

U.S. PATENT DOCUMENTS

| | | |
|---|---|---|
| 5,329,619 A | 7/1994 | Page |
| 5,440,551 A | 8/1995 | Suzuki |
| 5,448,566 A | 9/1995 | Richter |
| 5,448,567 A | 9/1995 | Dighe |
| 5,491,800 A | 2/1996 | Goldsmith |
| 5,497,463 A | 3/1996 | Stein |
| 5,499,343 A | 3/1996 | Pettus |
| 5,796,393 A | 8/1998 | MacNaughton |
| 6,020,884 A | 2/2000 | MacNaughton |
| 6,433,795 B1 | 8/2002 | MacNaughton |
| 6,519,568 B1 | 2/2003 | Harvey |
| 6,564,217 B2 | 5/2003 | Bunney |
| 6,651,086 B1 | 11/2003 | Manber |
| 7,054,900 B1 | 5/2006 | Goldston |
| 7,058,892 B1 | 6/2006 | MacNaughton |
| 7,630,986 B1 | 12/2009 | Herz |
| 7,774,431 B2 | 8/2010 | Conn |
| 7,925,548 B2 | 4/2011 | Alger |
| 7,970,891 B1 | 6/2011 | Kontothanssis |
| 8,812,620 B2 | 8/2014 | Reisman |
| 2002/0133482 A1 | 9/2002 | Wen Hung |
| 2002/0138588 A1 | 9/2002 | Leeds |
| 2003/0065737 A1* | 4/2003 | Aasman ............ G06F 17/30902 709/213 |
| 2004/0141016 A1 | 7/2004 | Fukatsu |
| 2005/0021611 A1* | 1/2005 | Knapp ................. G06Q 10/00 709/203 |
| 2005/0125504 A1 | 6/2005 | Leeds |
| 2005/0246193 A1 | 11/2005 | Roever |
| 2005/0266835 A1 | 12/2005 | Agrawal |
| 2006/0036966 A1 | 2/2006 | Yevdayev |
| 2006/0248160 A1 | 11/2006 | Plummer |
| 2006/0282336 A1 | 12/2006 | Huang |
| 2007/0005431 A1 | 1/2007 | Arauz |
| 2007/0011130 A1 | 1/2007 | Yamabuchi |
| 2007/0094271 A1 | 4/2007 | Juschkova |
| 2007/0177165 A1* | 8/2007 | Xie ........................ G06F 3/1206 358/1.1 |
| 2007/0204219 A1 | 8/2007 | Foulger |
| 2007/0208751 A1* | 9/2007 | Cowan .................. G06Q 30/02 |
| 2007/0220092 A1 | 9/2007 | Heitzeberg |
| 2007/0233671 A1 | 10/2007 | Oztekin |
| 2008/0015927 A1 | 1/2008 | Ramirez |
| 2008/0040658 A1 | 2/2008 | Reddy |
| 2008/0052539 A1 | 2/2008 | MacMillan |
| 2008/0072249 A1* | 3/2008 | Hovnanian ............ G06Q 30/02 725/34 |
| 2008/0222283 A1 | 9/2008 | Ertugrul |
| 2009/0006308 A1 | 1/2009 | Fonsen |
| 2009/0031004 A1 | 1/2009 | Yagoda |
| 2009/0070249 A1 | 3/2009 | Leach |
| 2009/0083815 A1 | 3/2009 | McMaster |
| 2010/0100536 A1 | 4/2010 | Chamberlain |
| 2010/0241507 A1 | 9/2010 | Quinn |

FOREIGN PATENT DOCUMENTS

| | | |
|---|---|---|
| WO | 2006107956 A1 | 10/2006 |
| WO | 2008122092 | 10/2008 |

OTHER PUBLICATIONS

International Preliminary Report of Patentability dated Oct. 30, 2009 in PCT/AU2009/001108.
International Search Report dated Jul. 14, 2008 in PCT/AU2008/000505.
International Search Report dated Oct. 30, 2009 in PCT/AU2009/001108.
Written Opinion of the International Searching Authority dated Jul. 14, 2008 in PCT/AU2008/000505.
Written Opinion of the International Searching Authority dated Oct. 30, 2009 in PCT/AU2009/001108.
Official Action from U.S. Appl. No. 12/595,443, dated Oct. 5, 2012.
Official Action from U.S. Appl. No. 12/595,443, dated Jul. 17, 2013.
Official Office Action from U.S. Appl. No. 12/595,443 mailed Oct. 21, 2014.

* cited by examiner

SYSTEM AND/OR METHOD FOR LINKING NETWORK CONTENT

CROSS-REFERENCE TO RELATED APPLICATIONS

This application is a continuation of U.S. patent application Ser. No. 13/035,885, filed Feb. 25, 2011 which is a continuation of PCT International Patent Application No. PCT/AU2009/001108, now expired, filed Aug. 27, 2009, which claims priority to and benefit of Australia Provisional Patent Application No. 2008904357, now expired, filed Aug. 27, 2008. Each of the aforementioned applications is incorporated herein by reference in its entirety.

TECHNICAL FIELD

The present invention relates generally, to a system and/or method for linking network content, and relates particularly, though not exclusively, to a system and/or method for linking World Wide Web (hereinafter simply referred to as "WWW") content. More particularly, the present invention relates to a system and/or method that enables web-users to discover, recommend and/or view WWW content related to other WWW content they are interested in and/or are viewing whilst navigating the web.

It will be convenient to hereinafter describe the invention in relation to a system and/or method for linking WWW content, however it should be appreciated that the present invention is not limited to that use only. The system and/or method of the present invention may also enable other forms of network content to be linked together without departing from the spirit and scope of the invention as hereinafter described. A suitable form of other network content may include, but is not limited to, company information and/or documents accessible to company staff via an intranet. Accordingly, throughout the ensuing description the expressions "content", "network content", "web content", "Internet content", or "WWW content" are intended to refer to any suitable form of information, documents and/or files that is/are accessible to users via any suitable communications network.

Similarly, throughout the ensuing description where the expressions "link", "linked" and/or "linking" are used, it should be understood that same are simply intended to refer to any suitable way in which various forms of network content may be connected to, or associated with, one another in order to enable users to discover, recommend and/or view network content related to other network content they are interested in and/or are viewing whilst navigating a communications network. For example, in the context of the WWW, a suitable "link" may be a 'hyper-link' which is a reference or navigation element from some point within one website to some point within another website, or another place (i.e. web-page) within the same website. Accordingly, although the present invention will hereinafter be described primarily with reference 'hyper-links', it should be understood that the present invention is not limited to that use only.

BACKGROUND ART

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure herein.

The development of the Internet has made a huge amount of content available to web-users. Never before has so much raw data, information, documents and/or files been available to so many. This sheer volume of network content has created its own problems as well as its own opportunities one of which has been the tremendous popularity of the search engine. As effective as search engine's are at finding raw information, web-users still have little way of knowing if the information contained within a particular website is reputable and accurate, or misleading and deceptive.

A system and/or method for at least partially alleviating this problem is disclosed in International Patent Application No.: PCT/AU2008/000505, filed on 9 Apr. 2008, in the name of the present applicant, Web Evaluation Pty Ltd, the entire contents of which are incorporated herein by this reference thereto. This system enables web-users to evaluate the relevance and/or reputability of WWW content by providing an independent forum facility that can be displayed side-by-side with WWW content being viewed. In this way, web-users can utilise the forum facilities provided to help them make informed decisions regarding the WWW content they are viewing.

However, with so much WWW content available and that content continuing to grow at an exponential rate, its becoming harder for web-users to efficiently sift through the volume of information to find the exact information they require or information that they are likely to be interested in. Existing search engines find raw information based on key-words entered by web-users. These search engines use various techniques to return results that are deemed to be of relevance based on the key-words submitted. The order of display of results within a search engine graphical user interface (hereinafter simply referred to as "GUI") is often determined based on proprietary popularity algorithms that take into consideration various aspects, as for example, the amount of times a website has been visited and/or the amount of instances of a key-word within the raw results located.

A problem with key-word based searching, and known search engines in general, is that it is often difficult to determine what key-words to use to find results of high relevance. For example, in the case of novice web-users, often the key-words that are selected are broad, or non-descriptive, which obviously leads to an enormous amount of irrelevant search results being returned when a search is performed. The problems associated with key-word based searching are exacerbated by the different meanings given to the same words used throughout the world.

A further problem with existing search engines is that because they use centralised databases to index the WWW, it is impossible for them to maintain an up-to-date index of dynamically generated websites. For this reason, relevant content of such websites may not be returned when a search is performed.

A need therefore exists for an improved system and/or method to enable web-users to discover relevant WWW content whilst navigating the web.

It is therefore an object of the present invention to provide a system and/or method for linking network content.

DISCLOSURE OF THE INVENTION

According to one aspect of the present invention there is provided a method for linking network content, said method including the steps of: providing at least one network server which generates, stores and/or maintains a plurality of linked-content facilities, each of said linked-content facilities being independently associated with a network location that contains network content; providing at least one user operable terminal with controlled access to said at least one network server and said linked-content facilities stored thereon; receiving and processing at said at least one network server a request sent from said at least one user operable terminal, via a communications network, to view and/or acquire a linked-content facility for a selected network location; and, displaying and/or providing said linked-content facility on and/or to said at least one user operable terminal for the selected network location.

Preferably said linked-content facilities stored and/or maintained on said at least one network server include system generated link content, and/or user generated link content received from at least one user of said at least one user operable terminal, regarding network content related to the respective network locations.

Preferably said method for linking network content further includes the steps of: receiving user generated link content from at least one of said user operable terminals, via at least one of said linked-content facilities, regarding related network content available at other network locations; storing said user generated link content on said at least one network server; selectively updating said at least one of said linked-content facilities with said user generated link content relevant thereto; and, making said updated linked-content facilities available to all of said user operable terminals; wherein said user generated link content, and/or said system generated link content, enables said users of said at least one user operable terminals to discover, recommend and/or view network content related to other network content they are interested in and/or are viewing whilst navigating said communications network.

Preferably said method for linking network content further includes the step of: acquiring/generating system generated link content for display within a linked-content facility utilising any one or more of the following methods: (i) evaluating the network content available at the respective network location; crawling and/or perusing said communications network in order to locate other network locations containing similar/related network content; and, adding links to said linked-content facility representing the other network locations that were discovered; (ii) acquiring tag information associated with the network content available at the respective network location; utilising the acquired tag information to locate other network locations having the same and/or similar tags information associated therewith; and, adding links to said linked-content facility representing the other network locations that were discovered; (iii) evaluating the network content available at the respective network location; utilising a network search facility (e.g. a search engine facility, including a third party search engine API, etc) to locate other network locations containing similar/related network content; and, adding links to said linked-content facility representing the other network locations that were discovered; and/or, (iv) evaluating existing user generated link content deemed to be related to the respective network located; utilising the existing user generated link content to locate other network locations having similar/related network content; and, adding links to said linked-content facility representing the other network locations that were discovered.

It is preferred that said users are provided with a means of rating said system and/or user generated link content such that said network server may utilise the user ratings received in order to determine the order of display of said system and/or user generated link content within said linked-content facilities. Preferably said rating system is any suitable rating system, including, but not limited to: a star rating system, as for example a 5 star rating system; a points rating system within a predetermined range, e.g. 1 to 10; or, a simple thumbs-up/thumbs-down (i.e. like/dislike) rating system.

In a practical preferred embodiment said at least one network server is at least one computing device which preferably includes at least one processor which is operable to execute software that maintains and controls access to said linked-content facilities for said user operable terminals. Preferably said linked-content facilities are stored on at least one memory or storage unit associated with said at least one computing device.

In a further practical preferred embodiment said at least one computing device is a web-server accessible to said at least one user operable terminal via said communications network, preferably the Internet, wherein said users can access said web-server via at least one software application installed on said at least one user operable terminal which may be permanently, or selectively, connected to said Internet. In this practical preferred embodiment said network content is WWW content and each of said linked-content facilities are independently associated with a network location, preferably a URL, containing said WWW content. Preferably said at least one user operable terminal is selected from the group consisting of: a PDA; a mobile or cellular telephone; a personal, tablet or notebook computer; or any other suitable computing or communications device. It is preferred that said linked-content facilities of said method for linking network content of the present invention provide an online link recommendation and/or display system that is accessible to said users in real time, i.e. "live". The provision of said linked-content facilities enables web-users to discover new WWW content that is highly likely to be related to the WWW content they are interested in and/or are viewing whilst navigating the Internet.

Preferably said method for linking network content further includes the steps of: querying said Internet at predetermined intervals to locate available URLs containing WWW content, and/or, receiving URLs from web-users wishing to view linked-content facilities for selected URLs; acquiring and storing at least selected ones of said URLs in at least one repository associated with said web-server; and, generating a linked-content facility for each of said URLs stored in said at least one repository.

In a preferred embodiment, said web-server is a search engine and said at least one software application installed on said at least one user operable terminal is a GUI, preferably a web-browser GUI. In this practical preferred embodiment said request sent from said at least one user operable terminal to said search engine, via said Internet, to view and/or acquire a linked-content facility for a selected URL is accomplished by said users clicking on, or hovering over, hyper-links or buttons displayed within said web-browser GUI that are associated with respective ones of a list of URLs, and/or other details pertaining thereto, containing WWW content that are displayed after a search has been performed. In a first form of this practical embodiment, it is preferred that said method further includes the step of: displaying at least one of said linked-content facilities beside a respective one of said URLs contained within said list of URLs that are displayed after a search has been performed (i.e. at least one linked-content facility can be selectively displayed within the search results screen beside its respective search result details). In a second, or alternative, form of this practical embodiment, it is preferred that said method further includes the step of: for a selected one of said URLs contained within said list of URLs, simultaneously displaying said WWW content available at said URL, and its independently associated linked-content facility: utilising a single screen of said web-browser GUI; or, utilising multiple screens, pop-up windows or tabs of said web-browser GUI.

In yet a further search engine (web-server) embodiment, said request sent from said at least one user operable terminal to said search engine, via said Internet, to view and/or acquire a linked-content facility for a selected URL may be accomplished by said users entering said selected URL directly into a search field provided by said search engine within said web-browser GUI (including a search field provided by way of a browser plug-in, toolbar, etc). In this further embodiment, it is preferred that said method further includes the step of: simultaneously displaying said WWW content available at said selected URL, and its independently associated linked-content facility: utilising a single screen of said web-browser GUI; or, utilising multiple screens, pop-up windows or tabs of said web-browser GUI.

In an alternative practical preferred embodiment said web-server is a dedicated network content linking server which may be used by said users to display said WWW content and said independently associated linked-content facilities. In this embodiment it is also preferred that said at least one software application installed on said at least one user operable terminal is a GUI, preferably a web-browser GUI. In various forms of this practical preferred embodiment said request sent from said at least one user operable terminal to said dedicated network content linking server, via said Internet, is accomplished by said users: entering a selected URL directly into a URL or search field built into said web-browser GUI; entering a selected URL into a search or retrieve URL field provided on a website displayed within said web-browser GUI; and/or, selecting a selected URL from a list of favourites or bookmarks accessible to said web-browser GUI (including browser and/or WWW-based bookmarks/favourites). Preferably after sending said request to said dedicated network content linking server, said web-browser GUI simultaneously displays said WWW content and its independently associated linked-content facilities: utilising a single screen of said web-browser GUI; or, utilising multiple screens, pop-up windows or tabs of said web-browser GUI.

In any one of the preceding practical embodiments, it is preferred that the display of said linked-content facilities within said web-browser GUIs may be selectively collapsed, moved, resized and/or removed depending on a users preference.

In an alternative form of any one of the practical preferred embodiments described in the preceding paragraphs, said linked-content facilities may be selectively displayed within a web-browser GUI utilising a browser plug-in, such as, for example, a toolbar or web-browser add-on. In accordance with this toolbar embodiment, it is further preferred that said toolbar includes at least two buttons, or the likes, for activating a link recommendation system which may also be provided by said web-server. A first of said at least two buttons being a 'bookmark' button to enable users to flag WWW content they like whilst navigating the Internet (which is then acquired by said web-server), and a second of said at least two buttons being a 'recommendation' button to enable users to retrieve and display random (recommended) WWW content available at a URL determined by said web-server that is similar to WWW content previously flagged by said user utilising said 'bookmark' button. Preferably the 'link recommendation system', and/or any other features offered by the browser toolbar, and/or any other suitable GUI add-on, may be operated by utilising keyboard 'hot-key' commands, and/or, by selecting menu items or buttons accessible to a user when a GUI pointing device (e.g. a mouse) is activated in a predetermined manner (e.g. right click, etc).

In yet a further practical preferred embodiment said web-server is a search engine or a dedicated network content linking server and said user operable terminals include two software applications installed thereon. A first of said two software applications being a GUI, preferably a web-browser GUI, for displaying said WWW content, and a second of said two software applications being a dedicated linked-content GUI for displaying said independently associated linked-content facilities. In this further practical preferred embodiment said users may selectively use both of said software applications to display said WWW content and said independently associated linked-content facilities.

In any one of the embodiments described hereinabove, it is preferred that when a user chooses to view and/or acquire WWW content available at a link provided within a particular linked-content facility, and/or a link to other WWW content provided within the WWW content itself, that WWW content is then displayed within at least one GUI along with the linked-content facility independently associated thereto. In other words, when a WWW user clicks on a link provided within a linked-content facility, and/or within the WWW content initially displayed, the WWW content available at that link is displayed, and at (around) the same time the linked-content facility dynamically updates to display the linked-content facility for the WWW content then being displayed. It is also preferred that a return link to the previously displayed WWW content is automatically added (by said web-server) to the linked-content facility presently being displayed beside the new WWW content so that the WWW user can return to the previous WWW content if desired, and/or rate the relevance of that previous WWW content to the new WWW content then being viewed (i.e. by rating the newly added return link then displayed within the present linked-content facility).

In any one of the preceding embodiments, aside from displaying physical links to respective URLs (e.g. hyperlinks, etc), said link-content facilities may also include/display, but are not limited to: images and/or thumbnails representing the WWW content available at respective URLs; tag and/or note information related to the WWW content available at respective URLs, as for example, tag information provided by other WWW users, or system retrieved tag information obtained via third party APIs, etc.

In a practical preferred embodiment, said linked-content facilities may provide a visual map representing the relationship between their independently associated WWW content and the system and/or user generated link content related thereto. In this way said system and/or user generated link content may be displayed within said linked-content facilities in such a way that the popularity of the links is visually represented in sequential order from, for example, the most popular to least popular links. In a preferred embodiment, a visual map of links could be provided within said linked-content facilities that displays the most popular links closest to the independently associated WWW content, with the less popular links further away.

Preferably each of said linked-content facilities includes at least one advertising space which can be used to display advertisements and/or sponsored links to said users. In a practical preferred embodiment, said advertisements and/or sponsored links displayed within said at least one advertising space provided on said linked-content facilities may change based on: the changing content of said system and/or user generated link content displayed within said linked-content facilities; the WWW content available at the system and/or user generated links; predetermined user preferences regarding WWW content and/or topics of interest to them; and/or, the WWW content associated with said linked-content facilities.

In accordance with yet a further practical preferred embodiment, the placement of user generated link content within said linked-content facilities could be charged on a link-by-link basis, or charged based on any other suitable criteria. Fees for the placement of user generated links may vary based on the popularity of the WWW content and/or URL concerned. This fee could be pre-set by a system administrator, or could be determined based on a market system whereby users could bid against one another to, for example, link their WWW content (e.g. their website) to the WWW content and/or URL concerned in this way, the highest bidder would win the right to attach their link to the URL concerned. Similarly, highly trafficked or popular URLs could be more expensive than less popular URLs, etc.

According to a further aspect of the present invention there is provided a machine readable medium storing a set of instructions that, when executed by a machine, cause the machine to execute a method for linking network content, said method including the steps of: providing a central repository for storing and/or maintaining a plurality of linked-content facilities, each of said linked-content facilities being independently associated with a network location that contains network content; providing at least one user operable terminal with controlled access to said linked-content facilities stored in said central repository; receiving and processing a request sent from said at least one user operable terminal, via a communications network, to view and/or acquire a linked-content facility for a selected network location; and, displaying and/or providing said linked-content facility on and/or to said at least one user operable terminal for the selected network location.

Preferably said linked-content facilities stored and/or maintained in said central repository include system generated link content, and/or user generated link content received from at least one user of said at least one user operable terminal, regarding network content related to the respective network locations.

According to yet a further aspect of the present invention there is provided a computer program including computer program code adapted to perform some or all of the steps of the method as described with reference to any one of the preceding paragraphs, when said computer program is run on a computer.

According to yet a further aspect of the present invention there is provided a computer program according to the preceding paragraph embodied on a computer readable medium.

According to yet a further aspect of the present invention there is provided a system for linking network content, said system being operable over a communications network, said system including: at least one memory or storage unit operable to store and/or maintain a plurality of linked-content facilities, each of said linked-content facilities being independently associated with a network location that contains network content; at least one processor operable to execute software that generates, maintains and/or controls access to said linked-content facilities for a plurality of users; and, at least one input/output device operable to provide an interface for said plurality of users to operate said software in order to retrieve and/or view said linked-content facilities for selected network locations from said at least one memory or storage unit, via said communications network; wherein said linked-content facilities stored and/or maintained on said at least one memory or storage unit include system generated link content, and/or user generated link content received from at least one of said plurality of users, regarding network content related to the respective network locations.

In a practical preferred embodiment said system includes at least one computing device having said at least one processor and said at least one memory or storage unit associated therewith. Preferably said at least one computing device is a network server connected to said communications network. It is also preferred that said network server is a web-server accessible to said plurality of users via said communications network, preferably the Internet. In this practical preferred embodiment said at least one input/output device is associated with at least one user operable terminal, wherein each of said plurality of users can access said linked-content facilities stored and/or maintained on said web-server via at least one software application installed on said at least one user operable terminal which may be permanently, or selectively, connected to said Internet. Preferably said at least one user operable terminal is selected from the group consisting of: a PDA; a mobile or cellular telephone; a personal, tablet or notebook computer; or any other suitable computing or communications device.

Preferably said network content is WWW content and each of said linked-content facilities are independently associated with a network location, preferably a URL, containing said WWW content.

In accordance with a first practical preferred embodiment, said linked-content facilities can be selectively displayed beside a list of URLs, and/or other details pertaining thereto, provided within a search engine GUI after an Internet search has been performed. In accordance with a second, alternative, or additional practical preferred embodiment, for any selected URL, said WWW content and its independently associated linked-content facility can be selectively and preferably simultaneously displayed within at least one GUI.

In either practical preferred embodiment, it is preferred that when a user chooses to view and/or acquire WWW content available at a link provided within a particular linked-content facility, and/or a link to other WWW content provided within the WWW content itself, that WWW content is then displayed within at least one GUI along with the linked-content facility independently associated thereto. In other words, when a user clicks on a link provided within a linked-content facility, and/or within the WWW content initially displayed, the WWW content available at that link is displayed, and at (around) the same time the linked-content facility dynamically updates to display the linked-content facility for the WWW content then being viewed.

It is preferred that other aspects and/or features of said system are the same as, or similar to, those described above with reference to the methods for linking network content.

According to yet a further aspect of the present invention there is provided a system for linking network content, preferably WWW content, said system being operable over a communications network, preferably the Internet, said system including: at least one network server connected to said communications network, said at least one network server, preferably a web-server, acting as a central repository for storing and/or maintaining a plurality of linked-content facilities, each of said linked-content facilities being independently associated with a network location, preferably a URL, that contains network content; and, at least one user operable terminal which can be selectively connected to said communications network for retrieving and/or displaying said linked-content facilities from said at least one network server for selected ones of said network locations; wherein said linked-content facilities stored and/or maintained on said at least one network server include system generated link content, and/or user generated link content received from at least one user of said at least one user operable terminal, regarding network content related to the respective network locations.

In accordance with a first practical preferred embodiment, said linked-content facilities can be selectively displayed beside a list of network locations, and/or other details pertaining thereto, provided within a search engine GUI after an Internet search has been performed. In accordance with a second, alternative, or additional practical preferred embodiment, for any selected network location, said network content and its independently associated linked-content facility can be selectively and preferably simultaneously displayed within at least one GUI.

In either practical preferred embodiment, it is preferred that when a user chooses to view and/or acquire network content available at a link provided within a particular linked-content facility, and/or a link to other WWW content provided within the WWW content itself, that network content is then displayed within at least one GUI along with the linked-content facility independently associated thereto. In other words, when a user clicks on a link provided within a linked-content facility, and/or within the WWW content initially displayed, the network content available at that link is displayed, and at (around) the same time the linked-content facility dynamically updates to display the linked-content facility for the network content then being viewed.

According to yet a further aspect of the present invention there is provided a method for linking WWW content via the Internet, said method including the steps of: acquiring details pertaining to network locations containing WWW content; generating an independently associated linked-content facility for each of said network locations for which details were acquired; and, selectively making said linked-content facilities available to WWW users upon request to enable them to discover, recommend and/or view WWW content related to other WWW content they are interested in and/or are viewing whilst navigating the Internet.

Preferably said network locations are URLs that specify the addresses of said WWW content, e.g. websites or webpages. It is further preferred that said step of acquiring details pertaining to URLs containing WWW content includes the step(s) of: querying said Internet at predetermined intervals to locate details of at least selected ones of available URLs; and/or, acquiring URLs details from said WWW users upon receiving requests to view linked-content facilities for selected URLs.

Preferably said linked-content facilities include system generated link content, and/or user generated link content received from at least one of said WWW users, regarding WWW content related to the respective URLs.

In accordance with a first practical embodiment, it is preferred that said method further includes the step of: displaying (preferably upon request) at least one of said linked-content facilities beside a list of URLs, and/or other details pertaining thereto, provided within a search engine GUI after an Internet search has been performed.

In accordance with a second, alternative, or additional practical embodiment it is preferred that said method further includes the step of: for any selected URL, simultaneously displaying (preferably upon request) said WWW content and its independently associated linked-content facility within at least one GUI.

In either practical embodiment, it is preferred that when a WWW user chooses to view and/or acquire WWW content available at a link provided within a particular linked-content facility, and/or a link to other WWW content provided within the WWW content itself, that WWW content is then displayed within at least one GUI along with the linked-content facility independently associated thereto. In other words, when a WWW user clicks on a link provided within a linked-content facility, and/or within the WWW content initially displayed, the WWW content available at that link is displayed, and at (around) the same time the linked-content facility dynamically updates to display the linked-content facility for the WWW content then being viewed.

ADVANTAGES OF THE INVENTION

Accordingly, the present invention provides a system, method and/or computer program for linking network content, preferably WWW content, to enable web-users to discover, recommend and/or view WWW content related to other WWW content they are interested in and/or are viewing whilst navigating the web.

In one preferred aspect, the present invention provides linked-content facilities that can be selectively displayed beside a list of network locations, etc, provided within a search engine GUI after an Internet search has been performed. In a further, alternative, or additional preferred aspect, the present invention provides linked-content facilities that, for any selected network location, can be simultaneously displayed beside their independently associated network content within at least one GUI.

In either preferred aspect, the linked-content facilities preferably include system generated link content, and/or user generated link content received from at least one user, regarding network content related to a respective network location.

In other words, the present invention preferably provides a convenient WWW link recommendation and/or display system that enables web-users to discover WWW content that is highly likely to be related to other WWW content they are interested in and/or are viewing whilst navigating the web.

These and other advantages of the present invention will become apparent from the detailed description of the preferred embodiments that now follows.

BRIEF DESCRIPTION OF THE DRAWINGS

In order that the invention may be more clearly understood and put into practical effect there shall now be described in detail preferred constructions of a system and/or method for linking network content in accordance with the invention. The ensuing description is given by way of non-limitative example only and is with reference to the accompanying drawings, wherein.

MODES FOR CARRYING OUT THE INVENTION

Figure 1:
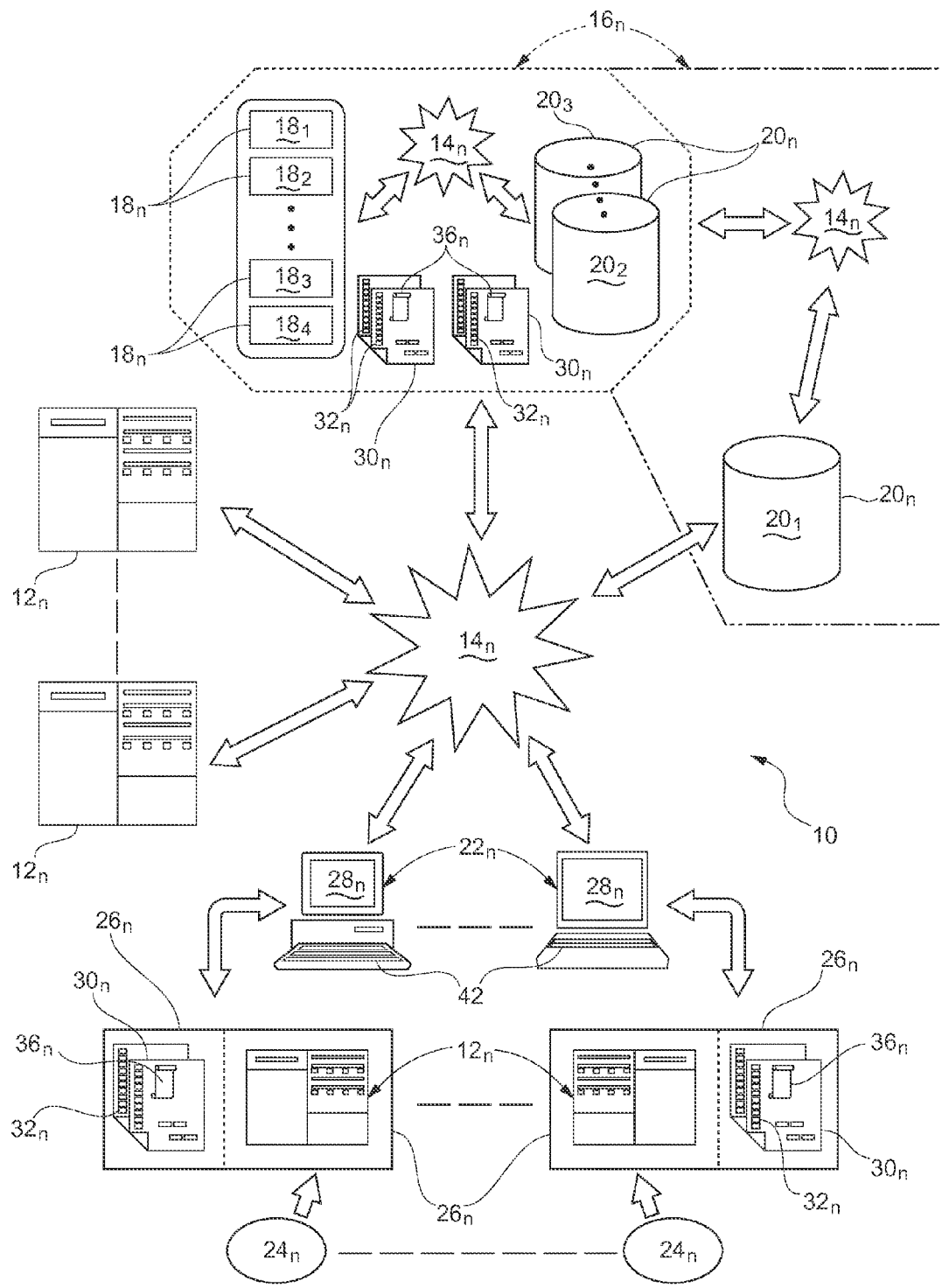
FIG. 1 is a block diagram of a system for linking network content, made in accordance with a preferred embodiment of the present invention.

In FIG. 1 there is shown a system 10 for linking network content $12_n$, for example, WWW content $12_n$ as shown. System 10 is suitable for use over a communications network $14_n$, for example, the Internet $14_n$ as shown. It should be understood however, that system 10 of the present invention is not limited to that use only.

System 10 includes at least one network server $16_n$ which hosts and/or maintains a plurality of tools or applications $18_n$, and databases $20_n$ that together provide a means of linking WWW content $12_n$.

Network server $16_n$ is designed to receive/transmit data from/to at least one input terminal $22_n$. The term "Input terminal $22_n$" refers to any suitable type of computing device capable of transmitting/receiving and displaying data as described herein, including, but not limited to, a Personal Digital Assistant (PDA) as for example a Palm Pilot®, a Wireless Application Protocol (WAP) capable communications device, as for example, a mobile or cellular phone, and/or any other suitable computing device, as for example a personal/desktop, tablet, or notebook computer.

Network server $16_n$ is configured to communicate with input terminals $22_n$ via any suitable communications connection or network $14_n$ (hereinafter referred to simply as a "network(s) $14_n$"). Input terminals $22_n$ are configured to display and/or retrieve network content $12_n$ from network $14_n$. Each input terminal $22_n$ may communicate with network server $16_n$ and/or network content $12_n$ via the same or a different network $14_n$. Suitable networks $14_n$ include, but are not limited to: a Local Area Network (LAN); a Personal Area Network (PAN), as for example an Intranet; a Wide Area Network (WAN), as for example the Internet; a Wireless Application Protocol (WAP) network; a Bluetooth network; and/or any suitable WiFi network (wireless network). Network server $16_n$ may include various types of hardware and/or software necessary for communicating with input terminals $22_n$ and/or additional computers/hardware (not shown) as for example routers, switches, access points and/or Internet gateways, each of which would be deemed appropriate by persons skilled in the relevant art.

Input terminals $22_n$ are each configured to be operated by at least one user $24_n$ of system 10. The term "user $24_n$" refers to any person in possession of, or stationed at, at least one input terminal $22_n$ whom is able to operate input terminal $22_n$ and transmit/receive data and/or display/retrieve network content $12_n$, as for example, a web-user, a staff member accessing an Intranet, and/or any other form of network user utilising any suitable software protocol, such as, for example, the so-called FTP and/or BitTorrent or similar peer-to-peer protocols. Input terminals $22_n$ may include various types of software and/or hardware required for capturing and/or displaying network content $12_n$ including, but not limited to: web-browser or other GUI application(s) $26_n$ (which could simply be an operating system installed on an input terminal $22_n$ that is capable of actively displaying network content $12_n$ on a screen without the need of a web-browser GUI, etc); monitor(s) $28_n$; GUI pointing devices (not shown); and/or, any other suitable data acquisition or display device(s) (not shown). Similarly, input terminals $22_n$ may also include various types of software and/or hardware suitable for transmitting/receiving data to/from network server $16_n$ via network(s) $14_n$.

Although the use of system 10 is specifically described with reference to users $24_n$ utilising input terminals $22_n$ to connect to, and interact with, network server $16_n$, via network $14_n$, it should be appreciated that system 10 of the present invention is not limited to that use only. In an alternative embodiment (not shown) users $24_n$ may simply interact directly with network server $16_n$ which may be their own personal computing device or a public computing device, as for example an Internet kiosk, library or Internet Café computing device(s). In this alternative embodiment, system 10 could be provided entirely by a single network server $16_n$ as a software and/or hardware application(s) and as such input terminals $22_n$ would not be essential to the operation of system 10. The present invention is therefore not limited to the specific arrangement shown in the drawings.

As is shown in FIG. 1, and explained in more detail with reference to FIGS. 2 to 7, it is preferred that network server $16_n$ is at least one web-server, or is connected via network(s) $14_n$ to at least one additional network server $16_n$ (not shown) acting as a web-server, such that system 10 is an online service accessible to users $24_n$ in possession of, or stationed at, input terminals $22_n$ connected to the Internet (network(s) $14_n$).

System 10 may be available to users $24_n$ for free, or may be offered to users $24_n$ on an "on demand" Application Service Provider (hereinafter simply referred to as "ASP") basis, with use thereof being charged accordingly. ASP usage may only apply to a select group of users $24_n$, such as, for example, professional and/or corporate users $24_n$, who may be heavy users of system 10.

It is preferred that network server $16_n$ utilises security to validate access from input terminals $22_n$. It is also preferred that network server $16_n$ performs validation functions to ensure the integrity of data transmitted between network server $16_n$ and input terminals $22_n$. A person skilled in the relevant art will appreciate such technologies and the many options available to achieve a desired level of security and/or data validation, and as such a detailed discussion of same will not be provided. Accordingly, the present invention should be construed as including within its scope any suitable security and/or data validation technologies as would be deemed appropriate by a person skilled in the relevant art.

Communication and/or data transfer between input terminals $22_n$ and network server $16_n$, via network(s) $14_n$, and/or the display of network content $12_n$ retrieved from network $14_n$ on input terminals $22_n$, may be achieved utilising any suitable communication and/or data transfer protocol, such as, for example, FTP, Hypertext Transfer Protocol (hereinafter simply referred to as "HTTP"), Electronic Mail (hereinafter simply referred to as "e-mail"), Transfer Control Protocol/Internet Protocol (hereinafter simply referred to as "TCP/IP"), Short Message Service (hereinafter simply referred to as "SMS"), Multimedia Message Service (hereinafter simply referred to as "MMS"), any suitable Internet based message service, any combination of the preceding protocols and/or technologies, and/or any other suitable protocol or communication technology that allows delivery of network content $12_n$ and/or communication/data transfer between input terminals $22_n$ and network server $16_n$.

Access to network server $16_n$, and the transfer of network content $12_n$ between input terminals $22_n$ and network server $16_n$, may be intermittently provided (for example, upon request), but is preferably provided "live", i.e. in real-time.

System 10 is designed to enable users $24_n$ to discover, recommend and/or view network content $12_n$ related to other network content $12_n$ they are interested in and/or are viewing whilst navigating a network $14_n$. To do this, system 10 provides interactive linked-content facilities that can be selectively displayed beside network content $12_n$ as same is viewed within at least one GUI $26_n$ (or beside a list of network content $12_n$ locations, and/or further details pertaining thereto, in the case of network server $16_n$ being a search engine—as will be described in detail later in this description).

Network server $16_n$, of system 10, includes a plurality of applications $18_n$ (such as software and/or hardware modules or engines) and databases $20_n$ that enable multiple aspects of system 10 to be provided over network $14_n$. These applications $18_n$ and databases $20_n$ include, but are not limited to: a network address database $20_1$; a linked-content facility database $20_2$; a user database $20_3$; a module or application for generating, maintaining and/or displaying linked-content facilities $18_1$ (hereinafter simply referred to as "linked-content facility display engine $18_1$"), a user registration and/or sign-in/sign-out engine $18_2$ (hereinafter simply referred to as "user administration engine $18_2$"); a user generated link content capture and/or administration engine $18_3$ (hereinafter simply referred to as "UGC administration engine $18_3$"); and/or, an advertisement and/or sponsored link placement engine $18_4$ (hereinafter simply referred to as "advertising engine $18_4$").

Databases $20_1, 20_2, 20_3 \ldots 20_n$ are preferably managed by a Database Management System(s) (hereinafter simply referred to as "DBMS(s)") installed on network server $16_n$ that enables data to be stored, modified, searched and/or extracted from respective databases $20_1, 20_2, 20_3 \ldots 20_n$. DBMS(s) (not shown) work with modules $18_1, 18_2, 18_3, 18_4 \ldots 18_n$ of system 10 to enable the storage, searching, display and/or extraction of system and/or user input data.

A detailed description of each of these databases $20_n$ and applications $18_n$ of system 10 will now be provided.

Network Address Database:

Network address database $20_1$ stores and/or maintains data pertaining to available network $14_n$ locations that contain network content $12_n$. In accordance with a preferred embodiment of the present invention, these network $14_n$ locations are URLs which identify Internet $14_n$ addresses or locations of WWW content $12_n$ (e.g. website or web-page locations, including hidden and/or dynamically generated web-pages, files, documents, etc).

Network address database $20_1$ stores URL data captured or acquired by system 10 and/or a third party provider (not shown), such as, for example, an Internet Corporation for Assigned Names and Numbers, and/or an existing search engine API interface. URL data stored in network address database $20_1$ is used by linked-content facility display engine $18_1$ of system 10 to generate linked-content facilities $30_n$ that are subsequently stored and/or maintained in linked-content facility database $20_2$.

As will be described in further detail below with reference to the flow diagrams of FIGS. 3 & 3a, system 10: may systematically acquire URL data at predetermined intervals in order to automatically generate linked-content facilities $30_n$ as new network locations (URLs) are discovered; and/or, may acquire URL data upon receiving a request from an input terminal $22_n$ to view a linked-content facility $30_n$ for a selected network location (URL), and hence, may generate linked-content facilities $30_n$ on the fly each time a request to view same is received from a user $24_n$, of system 10.

In FIG. 1, network server $16_n$ is shown in two distinct sections, each separated by a different style of phantom lines, to illustrate that network address database $20_1$ of system 10 may be provided and/or maintained by a third party network server $16_n$. Hence, networks $14_n$ are shown interconnecting databases $20_n$ to represent that they can be provided by a different network server(s) $16_n$.

Although illustrated as possibly being provided by a different or third party network server $16_n$, it should be appreciated that network address database $20_1$ may simply be embodied as part of a single network server $16_n$ of system 10. Hence, networks $14_n$ may simply be data buses $14_n$ interconnecting the various components, databases $20_n$ and/or applications $18_n$ of network server $16_n$.

It should therefore be appreciated that the actual location and/or provider of network address database $20_1$, and/or the URL data stored therein, and/or when the URL data is acquired/received (i.e. automatically and/or upon request), is/are not essential to the operation of system 10 of the present invention.

Linked-Content Facility Database:

Linked-content facility database $20_2$ stores and/or maintains data pertaining to linked-content facilities $30_n$ generated and maintained by linked-content facility display engine $18_1$ of system 10, as well as system and/or user generated link content $32_n$ (e.g. hyper-links $32_n$, and other details pertaining thereto—generally referred to as $32A_n$—e.g. images, thumbnails, tag information, meta-tag data, etc) generated/captured and subsequently displayed within linked-content facilities $30_n$.

In accordance with a preferred embodiment of the present invention, these linked-content facilities $30_n$ are linked-sites GUI's or pages $30_n$, each of which are independently associated with a particular URL stored in network address database $20_1$.

Linked-sites pages $30_n$ provide users $24_n$ with a means of discovering, recommending and/or viewing WWW content $12_n$ related to other WWW content $12_n$ they may be interested in and/or are viewing whilst navigating the web $14_n$. By selectively reviewing and/or clicking through to system generated links $32_n$, and/or user generated links $32_n$, displayed/provided within linked-sites pages $30_n$, a user $24_n$ can discover WWW content $12_n$ that may be related to other WWW content $12_n$ they are presently viewing within at least one GUI $26_n$ installed/running on their input terminal $22_n$.

Figure 2:
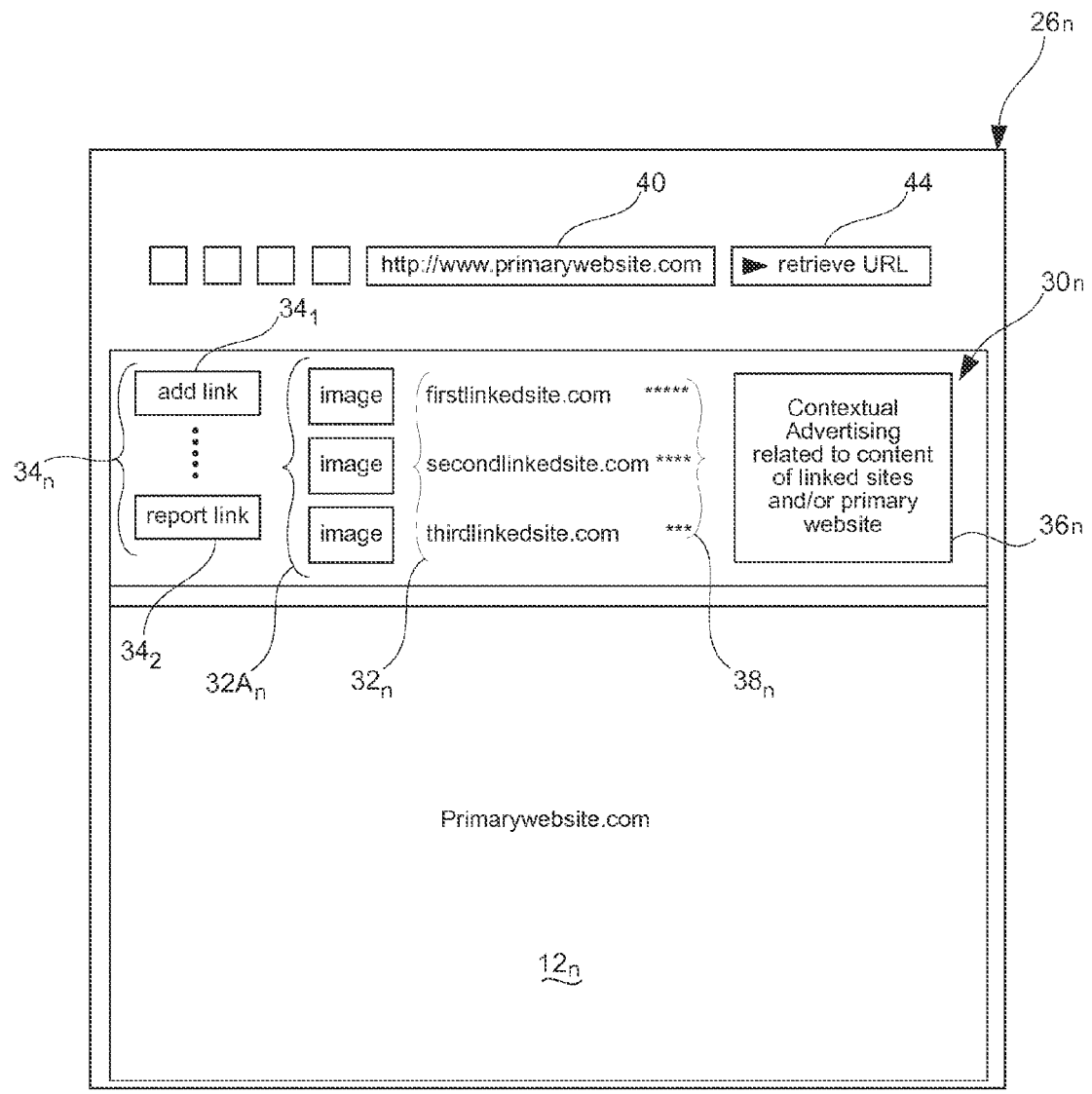
FIG. 2 is an exemplary GUI illustrating a preferred way of displaying a website and its independently associated linked-content facility within at least one GUI in accordance with the system for linking network content of FIG. 1.

An exemplary GUI $26_n$ (e.g. a web-browser GUI $26_n$, an operating system, or active desktop of an operating system, etc) illustrating a preferred construction of a linked-sites page $30_n$ displayed (in this example) simultaneously with its associated WWW content $12_n$ (e.g. a website or web-page $12_n$—referred to as 'primarywebsite.com' in a number of the drawings) is shown in FIG. 2.

Referring to FIG. 2, it can be seen that a linked-sites page $30_n$ may include a plurality of icons and/or buttons $34_n$ that allow a user $24_n$ of system 10 to perform a number of linked-sites page $30_n$ functions. For example, these buttons $34_n$ may include, but are not limited to: an 'add new link' button $34_1$ which may be used by users $24_n$ to submit user generated link content $32_n$; and/or, a 'report link' $34_2$ button which may enable users $24_n$ to request removal of a system and/or user generated link $32_n$ should they believe, for example, that a particular link $32_n$ is un-related to the associated WWW content $12_n$ (e.g. the link $32_n$ could be spam, etc), or that a particular link $32_n$ is offensive, etc.

Although not shown in the drawings, linked-sites pages $30_n$ may also include, but are not limited to: an open/close linked-sites button; a linked-sites slider or size adjustment button; and/or, an icon or display section to show users $24_n$ whether they are signed-in or signed-out, and/or to allow them to sign-in and sign-out as necessary (if registration and sign-in is required by system 10). An open/close button may enables users $24_n$ to selectively choose whether they wish to view a linked-sites page $30_n$ associated with WWW content $12_n$ they are viewing. A suitable slider button may be utilised by users $24_n$ to selectively adjust the size of the display of linked-sites page $30_n$ within a GUI $26_n$.

In FIG. 2 it can be seen that linked-sites pages $30_n$ also preferably include at least one advertising space $36_n$ that provides a convenient location for the placement of advertisements and/or sponsored links, etc, utilising, for example, advertising engine $18_4$ of system 10 of the present invention.

Linked-sites pages $30_n$ may be used by users $24_n$ of system 10 to add links $32_n$, e.g. hyper-links, to other WWW content $12_n$ (e.g. other websites or web-pages $12_n$) that they believe is/are related, or similar to, the WWW content associated with a particular linked-sites page $30_n$.

By allowing users $24_n$ of system 10 to add links $32_n$ to related websites $12_n$, etc, other users $24_n$ of system 10 can use linked-sites pages $30_n$ as a means of finding interesting and/or related websites $12_n$ that they may not have otherwise located by way of a conventional web-search facility (e.g. a search engine). For example, a user $24_n$ whilst viewing a mountain bike website $12_n$, may choose to add a link $32_n$ to a mountain bike club or a bike helmet supplier. In this way, a future user $24_n$ of system 10 would be presented with these links $32_n$ (and other associated information $32A_n$) within linked-sites page $30_n$, and hence, may choose to review the WWW content $12_n$ available at those links $32_n$.

In order to provide a means of filtering and/or controlling the display of system and/or user generated link content $32_n$ within linked-sites pages $30_n$, system 10 may utilise a suitable rating system that could allow users $24_n$ to rate and/or determine the quality/relevance of individual system and/or user generated link content $32_n$ displayed within linked-sites pages $30_n$. A suitable rating system could be a star rating system (see item $38_n$) that allocates a selected number of stars to system and/or user generated content $32_n$ within a range of available stars, as for example, a five star rating system as shown. System 10 could aggregate ratings or votes received from users $24_n$ of system 10 regarding system and/or user generated link content $32_n$, and could also possibly allocate an average star rating for each user $24_n$, and/or their individual user generated link content $32_n$. This rating could then be used by system 10 to, for example, determine the order of display of system and/or user generated links $32_n$, which may help users $24_n$ to assess the value and/or relevance of the links $32_n$ to the associated WWW content $12_n$. For example, in the case of a particular users $24_n$ user generated link content $32_n$, a user $24_n$ that consistently adds helpful or closely related links $32_n$, would have a higher average star rating than those that add useless or un-related links $32_n$. Again, in the context of rating a user $24_n$, as opposed to links $32_n$, in order to ensure that the rating allocated to a user $24_n$ of system 10, or their user generated link content $32_n$, is an accurate reflection of other users $24_n$ opinions, it may be necessary for system 10 to block users $24_n$ from submitting ratings for their own user generated link content $32_n$.

A suitable means of blocking a user(s) $24_n$ from rating there own links $32_n$ (including system generated links $32_n$ that represent the URL of a particular users $24_n$ own website $12_n$, etc) could include recording users $24_n$ IP address(es), or machine key(s), MAC address(es), etc, in order to prevent the same user(s) $24_n$ (or group of users $24_n$ in the case of a company IP Address, etc) from voting multiple times for the same link(s) $32_n$.

Similarly, system and/or user generated link content $32_n$ that are consistently rated as poor by users $24_n$ in connection with specific related websites $12_n$, etc, could be flagged for removal from a linked-sites page $30_n$, either automatically by a computer algorithm, or manually by an administrator of system 10. This would help to ensure that over time, all links $32_n$ that are connected to respective WWW content $12_n$ are highly likely to be relevant and helpful to users $24_n$.

Although the use of a star rating system has been proposed, wherein one star would represent the lowest rating and five stars would represent the highest rating, it should be appreciated that system 10 of the present invention is not limited to this specific example of a rating system. Many variations of suitable rating systems exist, such as, for example, a rating system that ranks users $24_n$, or system and/or user generated content $32_n$, out of 10, or even a simple two button like/dislike rating system (e.g. thumbs-up/thumbs-down), etc, and as such, these variations are intended to be included within the scope of the present application.

The actual positioning of system and/or user generated link content $32_n$ (and additional link related information $32A_n$) within a linked-sites page $30_n$, determined by any suitable rating system is preferably sequential, i.e. ordered from most popular to least popular (as indicated by the descending stars $38_n$ allocated to the links $32_n$ shown in linked-sites page $30_n$ of FIG. 2), but it is envisaged that other methods could be utilised to visually demonstrate the relationship between these links $32_n$ and the primary website $12_n$ (WWW content $12_n$) being viewed. Such an alternative system (see, for example, FIG. 7) could include a visual map that displays the most popular links $32_n$ that are considered to be the most closely related to the website $12_n$ being closest thereto, with the less popular, or least related, links $32_n$ being further away. Yet further embodiments (not shown), could provide the highest correlating links displayed larger, with least popular links displayed smaller (descending in order of relevance), or the most popular links displayed in the foreground with the least popular links displayed in the background, with each piece of content $12_n$ layered according to its relative popularity, etc.

Although specific examples of the features, construction, use and/or functionality of linked-sites pages $30_n$ of the present invention have been provided, it should be appreciated that the present invention is not limited to those examples only. A person skilled in the relevant art would appreciate the general operation and functionality of such an online link recommendation and display facility, and accordingly, would understand many alternative embodiments of such a facility. The present invention should therefore be construed as including within its scope any such alternative embodiments that would be deemed appropriate by a person skilled in the relevant art.

User Database:

User database $20_3$ stores personal and public information of users $24_n$ of system 10. During a sign-up or registration process (if required), or when updating their profile information (if applicable) utilising, for example, user administration engine $18_2$ users $24_n$ may select whether particular aspects (e.g. their name or nickname) of their profile are to be shared with other users $24_n$ of system 10.

Linked-Content Facility Display Engine:

Linked-content facility display engine $18_1$ is a structured application that enables users $24_n$, of system 10 to recommend and/or discover WWW content $12_n$, related to other WWW content $12_n$ they are interested in and/or are viewing whilst navigating the web $14_n$. To do this, linked-content display engine $18_1$ generates and maintains the interactive linked-sites pages $30_n$ (and system generated link content $32_n$ displayed therein) of the present invention that can be selectively displayed (preferably) beside network content $12_n$ as same is viewed within at least one GUI $26_n$ (or beside a list of network content $12_n$ locations, and/or further details pertaining thereto, in the case of network server $16_n$ being a search engine).

Figure 3:
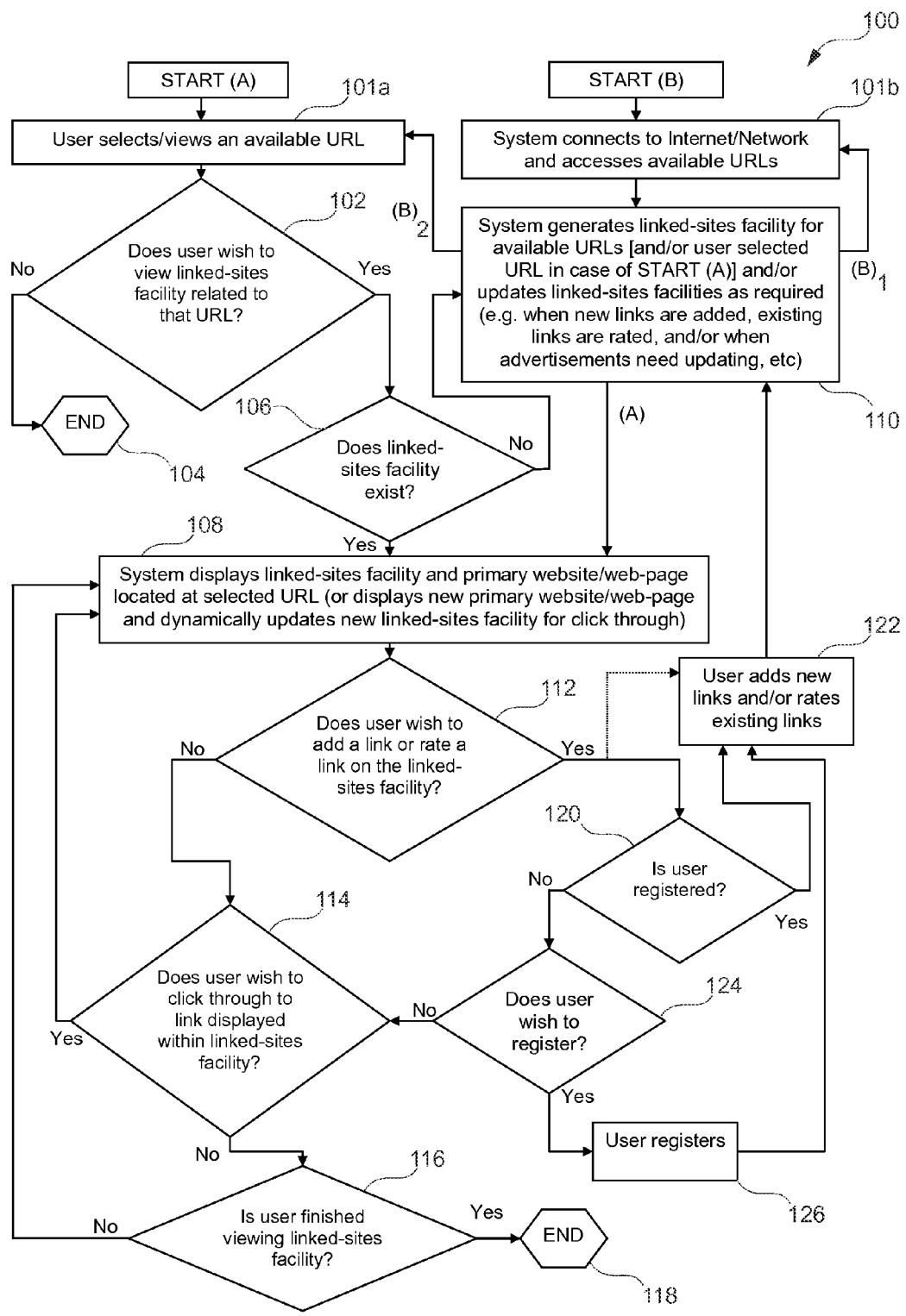
FIG. 3 is a flow diagram illustrating one embodiment of a method for linking network content, which is suitable for use with the system for linking network content of FIG. 1.

A flow diagram illustrating a preferred method 100 for linking WWW content $12_n$ in accordance with linked-content facility display engine $18_1$ is shown in FIG. 3. Method 100 of FIG. 3 is suitable for use with system 10 of FIG. 1. It should be understood that the embodiment provided in FIG. 3 only illustrates one way in which linked-sites pages $30_n$ (and system generated links $32_n$) may be generated, and selectively displayed beside the display of WWW content $12_n$ in accordance with system 10. Many other methods (not shown) may be utilised to achieve the same or similar result and as such the present invention is not limited to the specific example provided.

Method 100 of FIG. 3 will be described in conjunction with FIGS. 1 & 2. In FIG. 2, GUI $26_n$ is a web-browser GUI. It should be appreciated that any suitable GUI $26_n$ can be used (e.g. mobile/cell phone display, etc) depending on the application of system 10, and the way in which linked-sites pages $30_n$ of system 10 are accessible via the Internet $14_n$ (network(s) $14_n$) to users $24_n$ stationed at, or in possession of, input terminals $22_n$. Similarly, the content of GUI $26_n$, shown in FIG. 2 only represents an example of the type of information that can be displayed to users $24_n$ of system 10. Accordingly, the present invention should not be construed as being limited to any of the specific examples provided.

As can be seen in FIG. 3, method 100 for linking WWW content $12n$ in accordance with linked-content facility display engine $18_1$ can start at either, or both, of blocks 101a or blocks 101b, depending on whether linked-sites pages $30n$ are: [START (A)] generated on the fly (i.e. upon request) when users $24n$ wish to view/use linked-sites pages $30n$ for selected URLs (block 101a); and/or, [START (B)] automatically generated for all available URLs (block 101b).

Figure 5A:
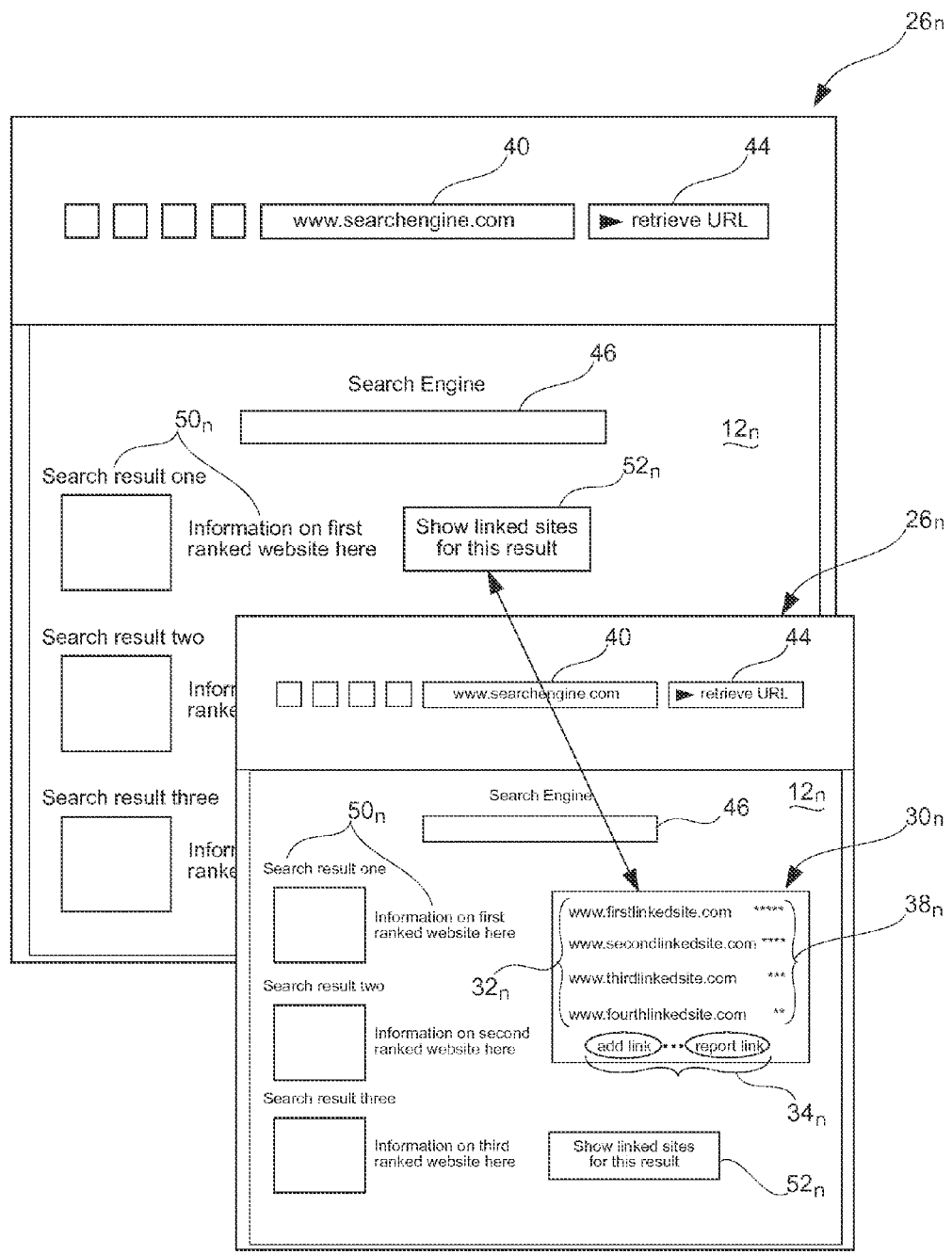
FIGS. 5a & 5b are exemplary GUI's illustrating further preferred examples of the use of the system for linking network content of FIG. 1, wherein it is shown that a web-user is able to view a website, or details pertaining thereto, and its independently associated linked-content facility within at least one GUI by clicking on, or hovering over, a hyper-link or button provided within a results screen of a search engine website, utilising for example, the method for linking network content of FIG. 3.

If START (A) is utilised, at block 101a, it can be seen that a user $24_n$ may initially be required to select an available URL (containing WWW content $12_n$ they wish to view) by way of a GUI $26_n$ installed on their input terminal $22_n$. Then, at decision block 102, user $24_n$ may be prompted (or may otherwise initiate the display of a linked-sites page $30_n$ by way of, for example, buttons, commands, etc) as to whether they would like to view the linked-sites page $30_n$ for the selected URL. In the case of the exemplary GUI $26_n$ shown in FIG. 2, it can be seen that user $24_n$ has entered a URL directly into the URL field 40 provided within their web-browser GUI $26_n$. Then, after pressing ENTER on a keyboard 42 connected to input terminal $22_n$, or clicking on the retrieve URL or GO button 44 provided within web-browser GUI $26_n$, a suitable request may be sent to network server $16_n$, via the Internet $14_n$, to initiate the display of the selected linked-sites page $30_n$. If, at decision block 102, user $24_n$ declines to view the linked-sites page $30_n$ for that URL, method 100 concludes at block 104, whereat only the selected WWW content $12_n$ is displayed (or maintained) within their web-browser GUI $26_n$. If, however, at decision block 102, user $24_n$ chooses to view the linked-sites page $30_n$ for that URL, method 100 continues at decision block 106, whereat a check is made by network server $16_n$, of system 10, to determine whether a linked-sites page $30_n$ for that selected URL already exists. If, at decision block 106, it is determined that a linked-sites page $30_n$ does in fact exist, method 100 continues at block 108, whereat the selected WWW content $12_n$ is displayed (or maintained) within GUI $26_n$, along with its independently associated linked-sites page $30_n$—which can be simultaneously displayed within the same or a separate web-browser GUI $26_n$, as is shown in FIG. 2—of which may be displayed along-side one or more of a list of URLs, etc, containing WWW content $12_n$ displayed within a search engine GUI $26_n$ after an Internet search has been performed, as is shown in FIG. 5a. If, at decision block 106, it is determined that a linked-sites page $30_n$ does not exist, method 100 continues at block 110, whereat network server $16_n$, of system 10, generates the required linked-sites page $30_n$ (and may also generate system generated link content $32_n$ as will be described in further detail below with reference to FIG. 3a) for that selected URL and subsequently stores that linked-sites page $30_n$ in linked-content facility database $20_2$, as hereinbefore defined. Thereafter, method 100 can continue at block 108 as indicated by arrow (A).

If START (B) is utilised, at block 101b, network server $16_n$ of system 10 may systematically query the Internet $14_n$ at predetermined intervals to locate available URLs. If available URLs are located, network server $16_n$ acquires and stores details pertaining to those URLs in network address database $20_1$. After locating and storing details of available URLs in network address database $20_1$, at block 110, network server $16_n$ generates a linked-sites page $30_n$ (and preferably system generated link content $32_n$—again, see below with reference to FIG. 3a) for each of the available URLs stored in network address database $20_1$. Data pertaining to these generated linked-sites pages $30_n$ is then stored by network server $16_n$ in linked-content facility database $20_2$ as before. Arrow $(B)_1$, illustrates that network server $16_n$ of system 10 continues to query the Internet $14_n$ at predetermined intervals to ensure that linked-sites pages $30_n$ for all (or at least as many as possible) available URLs are generated (and/or also indicates that network server $16_n$ continually uses the Internet $14_n$ to generate system links $32_n$) and made available to users $24_n$ of system 10. Arrow $(B)_2$, simply illustrates that these linked-sites pages $30_n$ are then available for use/viewing by/to users $24_n$ of system 10 as hereinbefore described with reference to START (A).

Hence, it should now be appreciated that, in either or both START (A) and/or START (B) scenarios, method 100 arrives at block 108, whereat selected WWW content $12_n$ may be displayed (or maintained) within at least one GUI $26_n$, along with its independently associated linked-sites page $30_n$. From this point onwards (as will now be described), users $24_n$ are able to review, click through to, and/or rate, system and/or user generated link content $32_n$, and/or, add their own user generated link content $32_n$ to a linked-sites page $30_n$, to help other users $24_n$ to find interesting and/or related WWW content $12_n$ for any given URL.

At decision block 112, user $24_n$ can decide, or may be prompted, as to whether they would like to add their own user generated link content $32_n$ to a linked-sites page $30_n$.

If at decision block 112, a user $24_n$ declines to add their own links $32_n$ to a linked-sites page $30_n$, at decision block 114 a user $24_n$ can decide, or may be prompted, as to whether they would like to click-through to a link $32_n$ displayed within a linked-sites page $30_n$. If, at decision block 114, a user $24_n$ declines to click through to a link $32_n$, method 100 continues at decision block 116, wherein a check may be made to see whether the user $24_n$ is finished reviewing the selected WWW content $12_n$ and its independently associated linked-sites page $30_n$. If at block 116, user $24_n$ is not finished reviewing the WWW content $12_n$ and linked-sites page $30_n$, method 100 returns to block 108, wherein the display of the WWW content $12_n$ and the linked-sites page $30_n$ is maintained. If, however, at decision block 116, user $24_n$ is finished reviewing the WWW content $12_n$ and linked-sites page $30_n$, method 100 concludes at block 118.

If at decision block 114, a user $24_n$ chooses to click through to related/recommended WWW content $12_n$ available via a system and/or user generated link $32_n$ displayed within linked-sites page $30_n$, and/or a link (not shown) to other WWW content $12_n$ provided within the WWW content $12_n$ itself, method 100 continues at, or returns to, block 108, whereat the new WWW content $12_n$ is displayed within their (at least one) GUI $26_n$, whilst at (around) the same time, the linked-sites page $30_n$ dynamically updates to display the system and/or user generated links $32_n$ available for the new URL (i.e. the links $32_n$ related to the WWW content $12_n$ available at the new URL).

In accordance with a further preferred aspect of the present invention, at this point, i.e. when the new WWW content $12_n$ and its associated linked-sites page $30_n$ are displayed within at least one GUI $26_n$ installed on an input terminal $22_n$, it is also preferred that a return link $32_n$ to the previously displayed WWW content $12_n$ is automatically added (by network server 16) to the linked-sites page $30_n$ then being displayed beside the new WWW content $12_n$ so that a user $24_n$ may return to the previous WWW content $12_n$ if desired, and/or may rate the relevance of that previous WWW content $12_n$ to the new WWW content $12_n$ then being viewed (i.e. by rating the newly added return link $32_n$ then displayed within the present linked-sites page 30). Although the addition of an automatically added return link $32_n$ is proposed, it will be appreciated that same is not essential to the operation of the present invention.

If at decision block 112, a user $24_n$ chooses to add their own user generated link content $32_n$ (e.g. hyper-links $32_n$ and related link information $32A_n$, e.g. images, tag information, etc) to a linked-sites page $30_n$, method 100 may continue at decision block 120, or block 122, depending on whether linked-content facility display engine $18_1$ of system 10 utilises a user administration engine $18_2$ in order to police the usage of system 10.

If linked-content facility display engine $18_1$ of system 10 does not utilise a user administration engine $18_2$, method 100 continues at block 122, whereat a user $24_n$ can input user generated link content $32_n$ (and associated information $32A_n$) to be added to a linked-sites page $30_n$. At this point, users $24_n$ may also rate the quality/relevance of existing system and/or user generated links $32_n$, if desired. After inputting a link $32_n$, etc, or rating existing links $32_n$, at block 122, method 100 returns to block 110, whereat network server $16_n$ of system 10 (possibly selectively) stores that user generated link content $32_n$ (or uses rating information—if applicable) in linked-content facility database $20_2$, and subsequently adds that user generated link content $32_n$ to the applicable linked-sites page $30_n$. Method 100 then continues as before until such a time that a user $24_n$ wishes to stop viewing selected WWW content $12_n$ and its independently associated linked-sites pages $30_n$ (i.e. ends at block 104 or 118).

If linked-content facility display engine $18_1$ of system 10 does utilise a user administration engine $18_2$, method 100 continues at decision block 120, whereat a check is made as to whether user $24_n$ is a registered user $24_n$ of system 10, and/or is signed-in to use system 10, in order to add/rate links $32_n$, etc, to/or linked-sites pages $30_n$. If user $24_n$ is a registered user $24_n$, and/or is signed-in to use system 10, method 100 continues at block 122, whereat, like before, user $24_n$ can input user generated link content $32_n$ (or rate existing links $32_n$) to be add to linked-sites pages $30_n$. However, if at block 120 it is determined that user $24_n$ is not a registered user $24_n$ of system 10, and/or is not signed-in to use system 10, method 100 continues at decision block 124, whereat user $24_n$ is prompted as to whether they would like to register and/or sign-in to add/rate links $32_n$, etc, on linked-sites pages 30 of system 10.

If at decision block 124, a user $24_n$ declines to register and/or sign-in to use system 10, method 100 continues at block 114, whereat, like before, the use of system 10 either ends at block 118 (via decision block 116), or returns to block 108 (via decision block 114 or 116), at which point the display of WWW content $12_n$ and its independently associated linked-sites pages $30_n$ is maintained (or dynamically updated in the case of a click through at decision block 114).

If at decision block 124, a user $24_n$ chooses to register and/or sign-in to use system 10, method 100 continues at block 126, whereat user $24_n$ may register to use system 10, and/or sign-in to system 10, in order to add links $32_n$, etc, on linked-sites pages $30_n$ of system 10. After registering and/or signing-in at block 126, method 100 continues at block 122, whereat, like before, a user $24_n$ can input user generated link content $32_n$, etc, or rate existing links $32_n$ to be added to linked-sites pages $30_n$.

Although not specifically shown in FIG. 3, method 100 may also include an additional block or step (not shown) of checking user generated link content $32_n$ (or associated link information 32A) for suitability and/or appropriateness utilising, for example, UGC administration engine $18_3$ of system 10.

As already briefly described above, linked-content facility display engine $18_1$ may also be used by system 10 for generating, updating and displaying system generated link content $32_n$ within linked-sites pages $30_n$.

Figure 3A:
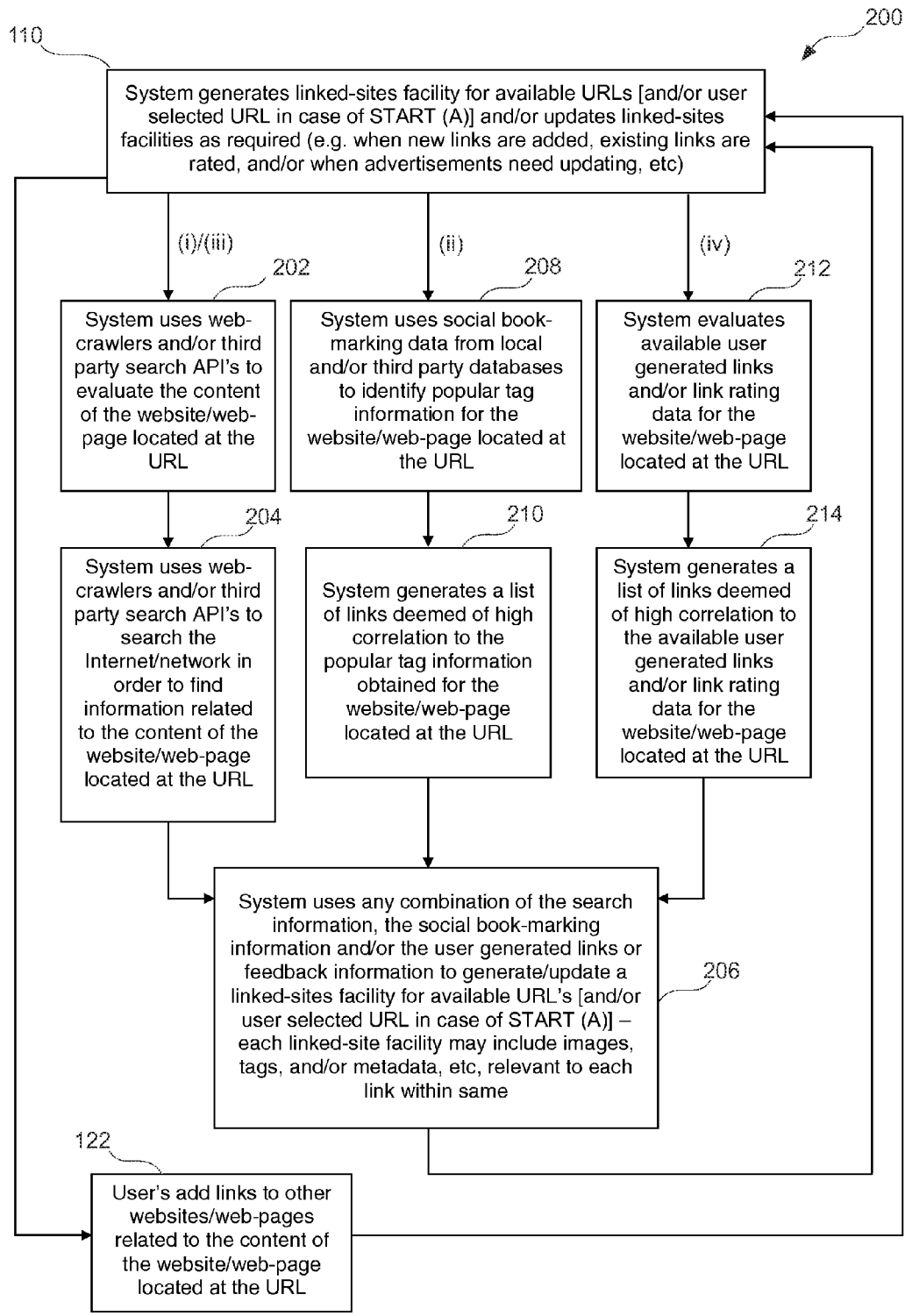
FIG. 3a is a flow diagram illustrating one embodiment of a method for generating and/or updating linked-content facilities in accordance with the method for linking network content shown in FIG. 3.

A flow diagram illustrating a preferred method 200 for generating, updating and/or displaying system generated link content $32_n$ within linked-sites pages $30_n$ in accordance with linked-content facility display engine $18_1$ is shown in FIG. 3a. Method 200, of FIG. 3a, is suitable for use within/as block 110 of method 100 for linking WWW content shown in FIG. 3, and hence, is also suitable for use with system 10 of FIG. 1. It should be understood that the embodiment provided in FIG. 3a only illustrates one way in which system generated link content $32_n$ may be generated and displayed within linked-sites pages $30_n$ in accordance with system 10. Many other methods (not shown) may be utilised to achieve the same or similar result and as such the present invention is not limited to the specific example provided.

As can be seen in FIG. 3a, system generated link content $32_n$ may be acquired and/or generated for display within linked-sites pages $30_n$ in any of a variety of ways (which may overlap, or be used in combination, etc) in accordance with preferred method 200 of the present invention. More particularly, preferred method 200 of FIG. 3a preferably provides at least four unique methods, i.e. avenues (i) to (iv) as shown, for providing/acquiring system generated link content $32_n$ for display within linked-sites pages $30_n$, which can be summarised as follows: (i) system 10 may evaluate the WWW content $12_n$ available at a selected URL using a suitable (system 10) web-crawling tool or facility (block 202); system 10 may then crawl the web $14_n$ utilising the same or a similar web-crawling tool in order to locate other URLs containing similar or related WWW content $12_n$ (block 204); and, system 10 may then add links $32_n$, to the applicable linked-sites page 30 representing the other URLs that were discovered (block 206); (ii) system 10 may acquire tag information (here the term lag' is used to denote words that web-users $24_n$ associate with particular websites $12_n$, usually via online book-marking services, such as, for example, the popular 'www.delicious.com' social book-marking service) associated with the WWW content $12_n$ available at a selected URL from a local (system 10) and/or third party database (block 208); system 10 may then utilise the acquired tag information in order to generate a list of other URLs having the same or similar tag's associated therewith (block 210); and, system 10 may then add links $32_n$, to the applicable linked-sites page 30 representing one or more of the URLs contained within the list of URLs that was generated (block 206); (iii) system 10 may evaluate the WWW content $12_n$ available at a selected URL utilising a third party web search facility such as, for example, a search engine API facility (block 202); system 10 may then search the web $14_n$ utilising the same or a similar third party web search facility in order to locate other URLs containing similar or related WWW content $12_n$ (block 204); and, system 10 may then add links $32_n$ to the applicable linked-sites page 30 representing the other URLs that were discovered by the third party web search facility (block 206); and/or, (iv) system 10 may evaluate existing user generated link content $32_n$, and/or related user generated link information 32A (including user $24_n$ rating information) contained within linked-content facility database $20_2$ related to a selected URL (block 212); system 10 may then utilise details pertaining to the existing user generated link content $32_n$,$32A_n$ to generate a list of other URLs having similar or related WWW content $12n$ associated therewith (block 214); and, system 10 may then add links $32_n$ to the applicable linked-sites page $30_n$, representing one or more of the URLs contained within the list of URLs that was generated (block 206).

Although specific examples of preferred methods of obtaining and providing system generated link content $32_n$, and associated link information $32A_n$ within linked-sites pages $30_n$, have been provided, and described with reference to preferred method 200, a person skilled in the relevant art will appreciate many other ways in which system link content $32_n$,$32A_n$ can be generated. Accordingly, the present invention should not be construed as limited to the specific examples provided.

Although not shown in the drawings, in accordance with yet a further preferred aspect of the present invention, system 10 may incorporate a payment system for generating revenue associated with the placement of user generated link content $32_n$ within linked-sites pages $30_n$. Such a payment system could include charging users $24_n$ on a link-by-link basis, or charging based on any other suitable criteria. Fees for the placement of user generated links $32_n$ may vary based on the popularity of the WWW content $12_n$ and/or URL concerned. This fee could be pre-set by a system administrator, or could be determined based on a market system whereby users $24_n$ could bid against one another to, for example, link $32_n$ their WWW content $12_n$ (e.g. their website) to the WWW content $12_n$ and/or URL concerned—in this way, the highest bidder would win the right to attach their link $32_n$ to the URL concerned. Similarly, highly trafficked or popular URLs could be more expensive than less popular URLs, etc. It will be appreciated that the use of a link payment system is not essential to the operation of the present invention.

User Administration Engine:

As already briefly described above with reference to linked-content facility display engine $18_1$, user administration engine $18_2$ is a structured application that may be utilised by network server $16_n$ to police the use of system 10. User administration engine $18_2$ may be used at blocks 120 to 126 of preferred method 100 of FIG. 3, to control access to the adding of user generated link content $32_n$, or user $24_n$ rating of existing links $32_n$, to/on linked-sites pages $30_n$ of system 10.

In accordance with a preferred embodiment of the present invention, during the registration and/or sign-in process of system 10 (block 126 of FIG. 3), users $24_n$ must agree to predetermined acceptable Terms of Use before they can add/rate links $32_n$, etc, to/on linked-sites pages $30_n$ of system 10. The predetermined Terms of Use may simply be an extension of related Terms of Use for other website usage, such as, for example, a search engine.

The registration and/or sign-in process of system 10 may also require: a valid e-mail address; IP logging within each session; and/or, the use of suitable security certificates which must be installed locally on input terminals $22_n$ before users $24_n$ are able to add/rate link content $32_n$ to/on linked-sites pages $30_n$. Cookies could be used to automatically sign-in a user $24_n$ to system 10 after the registration process has been successfully completed.

UGC Administration Engine:

As already briefly described above with reference to linked-content facility display engine $18_1$, UGC administration engine $18_3$ is a structured application that may be utilised by network server $16_n$ to administer the content of user generated link content $32_n$, added to linked-sites pages $30_n$ of system 10. UGC administration engine $18_3$ may be used by system 10 to block the addition of certain types of user generated link content $32_n$ (or associated link information $32A_n$—e.g. offensive or pornographic images or thumbnails, etc) on linked-sites pages $30_n$ and/or may be used to remove particular user generated link content $32_n$ from linked-sites pages $30_n$ should objections regarding the links $32_n$ be received from other users $24_n$ (by, for example, the use of the 'report link' buttons $34_2$ provided within linked-sites pages 32) or other individuals having reason to question that content.

Advertising Engine:

Advertising engine $18_4$ is a structured application that can be used to automatically place and maintain advertisements, and/or sponsored links, etc, within the advertising spaces $36_n$ provided within linked-sites pages $30_n$ of system 10. A person skilled in the relevant art would appreciate many ways in which advertisements, etc, can be placed within advertising spaces $36_n$ provided within GUI's $26_n$, and as such, a detailed discussion of same will not be provided herein. The present invention should be construed as including within its scope any suitable means of placing advertisements, etc, within advertising spaces $36_n$ of linked-sites pages $30_n$, within a GUI $26_n$.

The placement of advertisements within advertising spaces 36 of linked-sites pages $30_n$ can be used to create competition when viewing WWW content $12_n$, e.g. a competitor can purchase that advertising space $36_n$. Thus system 10 provides a unique opportunity for advertisers to reach their competitors customers directly, i.e. by purchasing the/an advertising space $36_n$ available on a linked-sites page $30_n$ independently associated with their competitor's website $12_n$, etc. This type of target marketing/advertising is believed to have not before been provided on the Internet $12_n$.

As the content of linked-sites pages $30_n$, continually changes with the addition of each and every system and/or user generated link $32_n$, etc, advertising engine $18_4$ of system 10 may also update the advertisements and/or sponsored links displayed within an advertising space $36_n$ provided on a linked-sites page $30_n$, or within a search engine results screen (see for example FIGS. 5a & 5b) incorporating the invention, based on, for example: the changing content of the system and/or user generated link content $32_n$ (and/or related link information 32A) displayed within the linked-sites pages $30_n$; the WWW content $12_n$ available at the respective links $32_n$ (URLs) provided within linked-sites pages $30_n$; and/or, the WWW content $12_n$ associated with the linked-sites pages $30_n$.

Further still, and in accordance with a further preferred aspect of the present invention, system 10 may also enable users $24_n$ to enter user preferences regarding WWW content $12_n$ and/or topics of interest to them (such could be obtained as part of a sign-up or registration process, etc) which could then be combined (by system 10) with user $24_n$ web viewing patterns, etc, to further assist system 10 in refining the delivery of advertisements tailored to the individual user $24_n$ to improve the response rate or click-through rate on system advertisements displayed within advertising spaces $36_n$.

As the use of system 10 grows, the user generated link content $32_n$ added to linked-sites pages $30_n$ and stored in linked-content facility database $20_2$ will grow enormously. This will enable advanced data mining techniques to be used to improve target advertisements. Both the linked-sites pages $30_n$, and/or their corresponding WWW content $12_n$, could be mined to continually update the advertisements and/or sponsored links that are displayed within advertising spaces $36_n$ of linked-sites pages $30_n$. This type of data mining would provide a level and type of targeting advertising delivery not before been achievable.

Aside from using advertising spaces $36_n$ in accordance with conventional advertising techniques, advertising spaces $36_n$ of linked-sites pages $30_n$ of the present invention may also provide a convenient location to include, and hence run, promotional offers, e.g. sales promotional offers, within linked-sites pages $30_n$. For example, coupon or rebate type sales promotions could be offered to users $24_n$ within linked-sites pages $30_n$ of system 10.

To provide a better understanding of the operation of system 10, a number of examples of possible uses of system 10 will now be described with reference to FIGS. 4a to 7. It should be appreciated that the examples that follow only represent a portion of the possible uses of system 10 and as such the present invention should not be construed as limited to those examples provided.

Figure 4A:
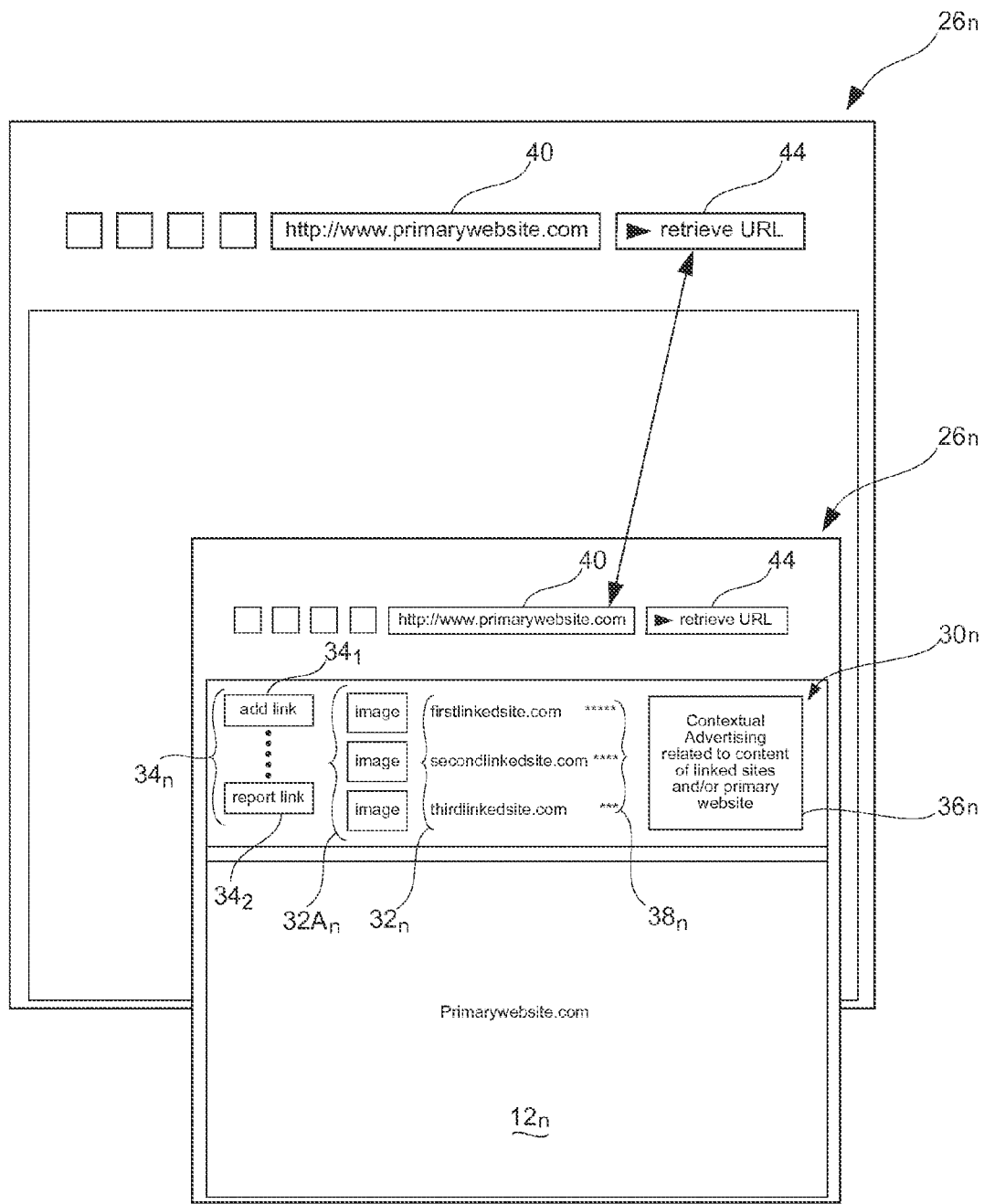
FIGS. 4a to 4c are exemplary GUI's illustrating preferred examples of the use of the system for linking network content of FIG. 1, wherein it is shown that a web-user is able to view a website and its independently associated linked-content facility by: entering a selected URL directly into a URL or search field built into a web-browser (FIG. 4a); entering a selected URL into a search or retrieve URL field provided on a website displayed within a web-browser (FIG. 4b); and/or, selecting a predefined URL from a list of favourites or bookmarks accessible via a web-browser (FIG. 4c); each utilising, for example, the method for linking network content of FIG. 3.
Figure 4B:
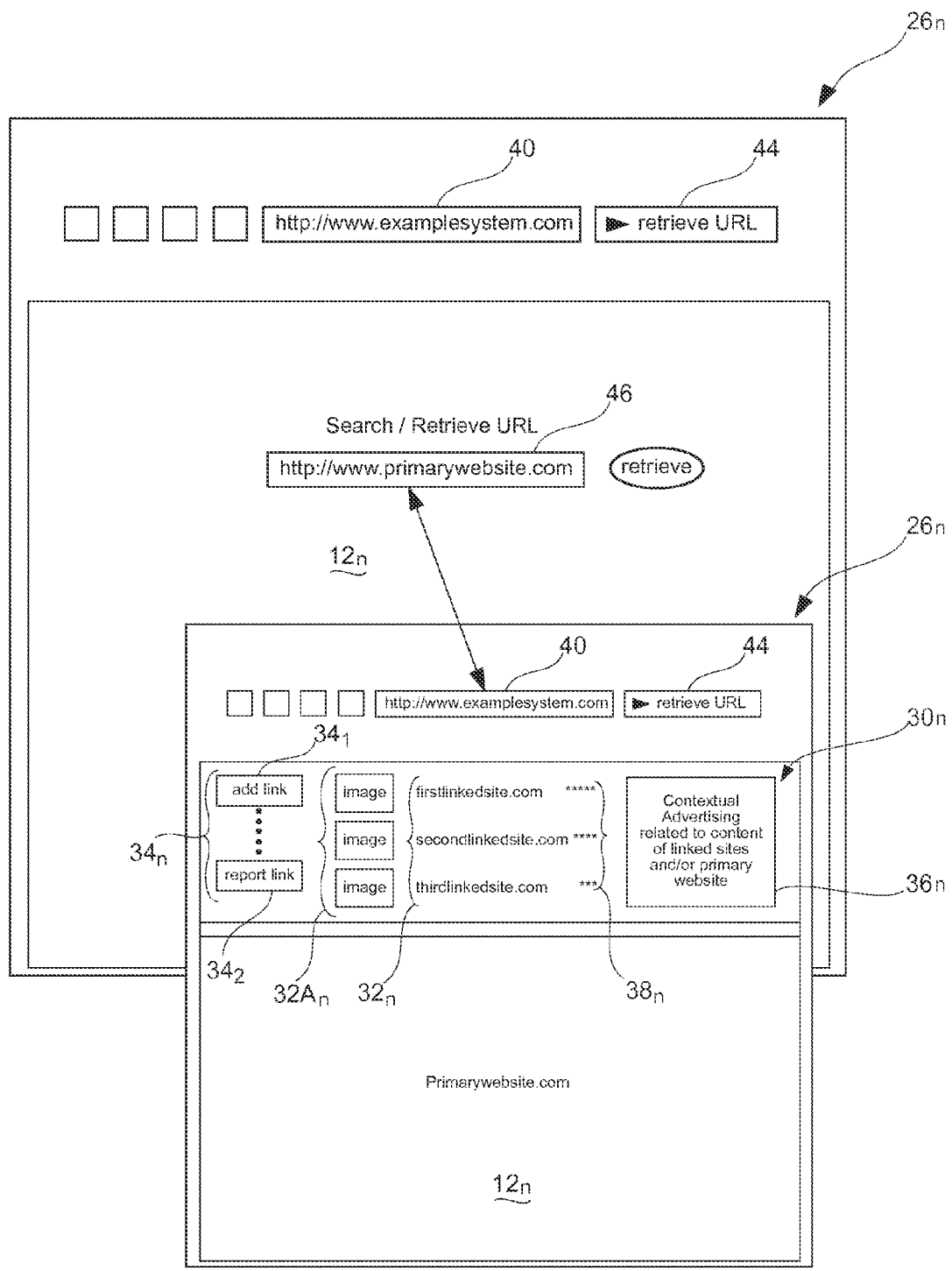
Figure 4C:
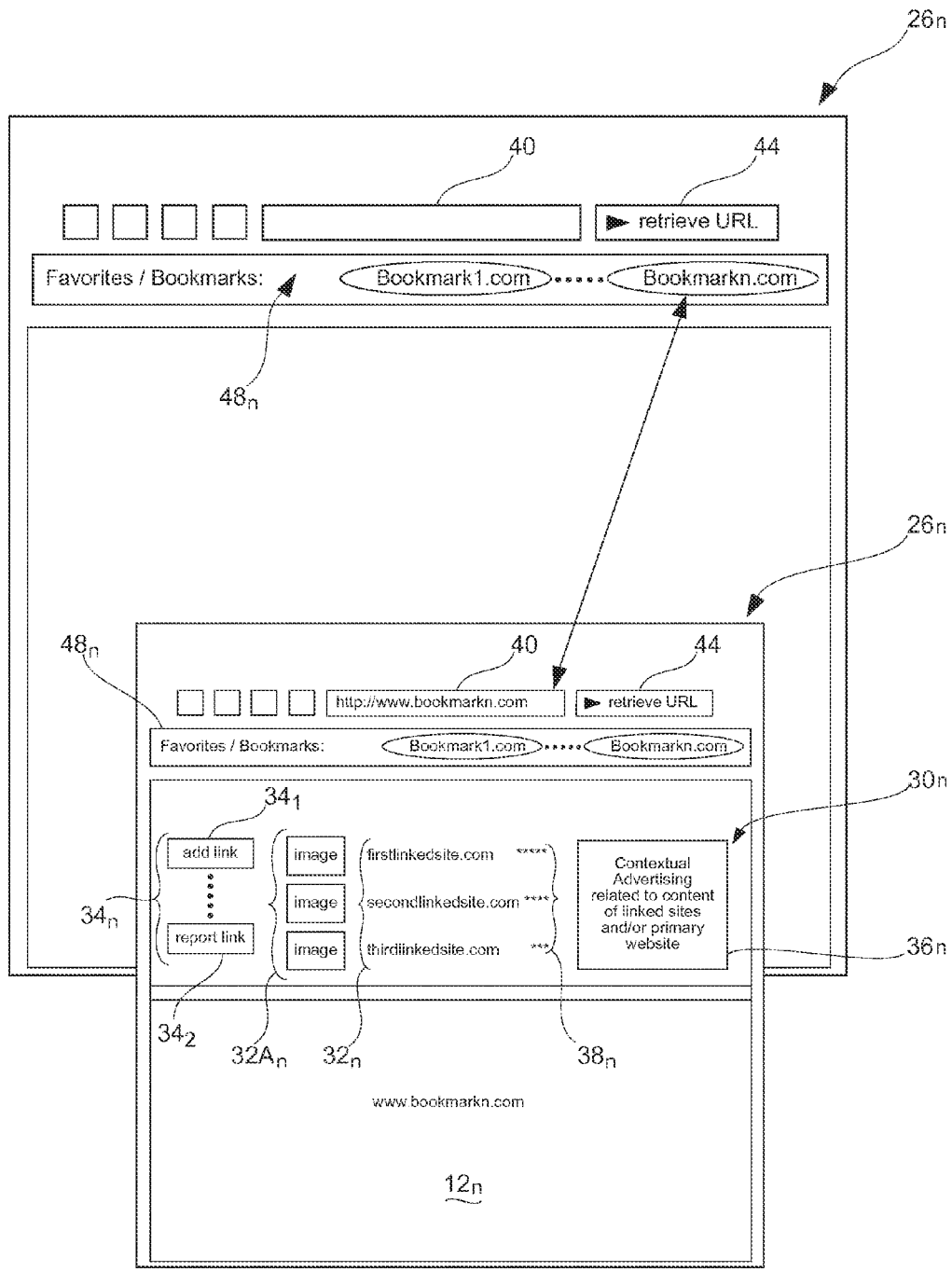

Entering a URL Directly into a GUI or a Website, or Selecting a Bookmark:

In FIGS. 4a to 4c there are shown exemplary GUI's $26_n$, which illustrate preferred examples of the use of system 10 of FIG. 1, wherein it can be seen that a user $24_n$ is able to view a website $12_n$ and its independently associated linked-sites page $30_n$ by: entering a selected URL directly into a URL field 40 or search field built into a web-browser GUI $26_n$ (FIG. 4a); entering a selected URL into a search or retrieve URL field 46 provided on a website $12_n$ displayed within a web-browser GUI $26_n$ (FIG. 4b); and/or, selecting a predefined URL from a list of favourites or bookmarks $48_n$ accessible via a web-browser GUI $26_n$—including browser-based and online bookmarks, etc—(FIG. 4c).

In the example shown in FIG. 4a, web-browser GUI $26_n$ may require a suitable (purpose-built) plug-in, or add-on, in order to enable the web-browser $26_n$ to determine that for all selected URLs that are entered directly into URL field 40, or search field (not shown), it is to display the selected WWW content $12_n$ and its independently associated linked-sites page $30_n$. In an alternative embodiment (not shown), instead of utilising a browser plug-in, users $24_n$ of system 10 may be required to enter the selected URL into the URL or search field 40 of the web-browser GUI $26_n$ in a specific format which may include the URL address of network server $16_n$ (not shown). In this way, the selected URL could be conveniently passed to network server $16_n$ as part of the text that is entered into the URL field 40, etc, of web-browser GUI $26_n$ by a user $24_n$.

In one embodiment of the examples shown in FIGS. 4a to 4c, network server $16_n$ (not shown) of system 10 may be a dedicated network content linking server $16_n$ which may be used by users $24_n$ to simultaneously display WWW content $12_n$ available at the URL: entered directly into the URL or search fields 40 of web-browser GUI $26_n$ (FIG. 4a); entered into the search or retrieve URL field 46 of website $12_n$ displayed within web-browser GUI $26_n$ (FIG. 4b); and/or, selected from one of the available bookmarks $48_n$, accessible to web-browser GUI $26_n$ (FIG. 4c); and its independently associated linked-sites page $30_n$.

In an alternative embodiment of the example shown in FIG. 4b, network server $16_n$ (not shown) of system 10 may be a search engine, and hence, the website $12_n$ displayed within web-browser GUI $26_n$ in this figure may simply be the search or home page $12_n$ of that search engine (i.e. network server $16_n$). In this way, and in accordance with a further preferred aspect of the present invention, the search field 46 of website $12_n$ shown displayed within web-browser GUI $26_n$ of FIG. 4b, may be used as conventional, i.e. in order to perform 'keyword-based' web-searches (see FIGS. 5a & 5b), or may be used in a novel way in accordance with the invention to automatically and (preferably) simultaneously display WWW content $12_n$ available at a selected URL entered into the website search field 46, of website $12_n$, and its independently associated linked-sites page $30_n$.

In the example shown in FIG. 4c, any suitable predetermined favourite or book-marked URL accessible to GUI $26_n$ could be used to trigger the simultaneous display of favourite/book-marked WWW content $12_n$ and its independently associated linked-sites page $30_n$. Suitable examples include, but are not limited to: book-marks saved directly into a web-browser GUI's $26_n$ favourite menu; and/or, online book-marked saved by a user $24_n$ utilising, for example, a social book-marking facility (e.g. www.delicious.com, etc).

Although not shown in any one of FIGS. 4a to 4c, linked-sites pages $30_n$ may be collapsed, resized, opened/closed, etc, as desired by way of suitable buttons $34_n$, or menu commands accessible to users $24_n$ of system 10.

Figure 5B:
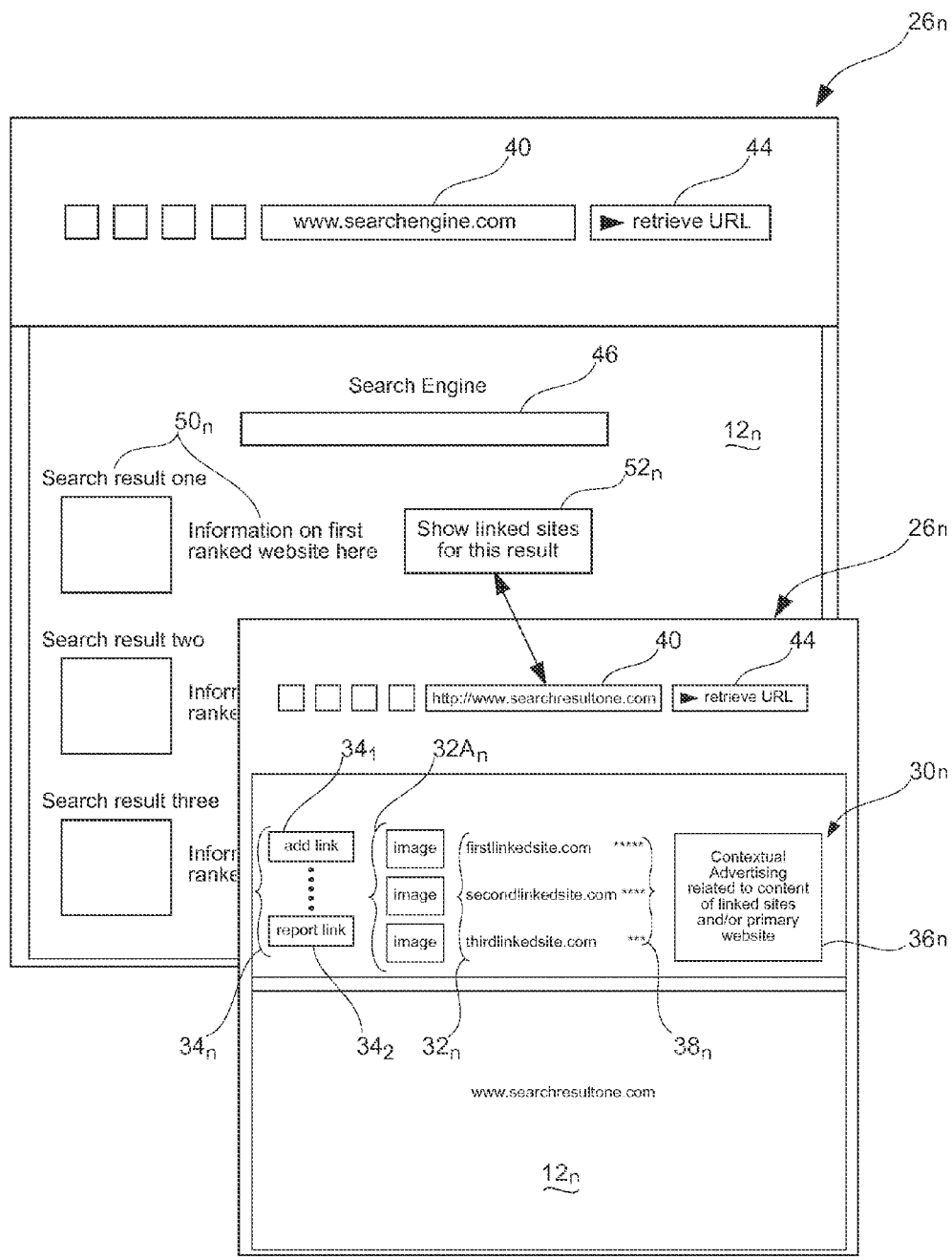

Clicking on a Hyper-Link or Button within a Search Engine Results Screen:

In FIGS. 5a & 5b there are shown exemplary GUI's $26_n$ which illustrate further preferred examples of the use of system 10 of FIG. 1. In these examples, network server $16_n$ is a search engine, and it can be seen that a user $24_n$ is able to view a website $12_n$ (FIG. 5b), or details pertaining thereto (FIG. 5a), and its independently associated linked-sites page $30_n$ within at least one GUI $26_n$ by clicking on, or hovering over, a hyper-link $50_n$, or button $52_n$, provided within a results screen $12_n$ of search engine $16_n$ after a keyword-based web-search has been performed.

In the first search engine 16n embodiment shown in FIG. 5a, it can be seen that at least one linked-sites page 30n can be selectively displayed (by clicking on button 52n, etc) beside a respective URL (and or associated information) contained within a list of URLs (e.g. hyper-links 50n, etc) that are displayed after a search has been performed. In other words, at least one linked-sites page 30n can be selectively displayed within the search results screen 12n—beside its respective search result details 50n, etc.

In the second, or alternative, search engine $16_n$ embodiment shown in FIG. 5b, it can be seen that for any selected URL contained within a list of URLs (e.g. hyper-links $50_n$, etc) that are displayed after a search had been performed, a user $24_n$ can initiate the (preferably simultaneously) display of the WWW content $12_n$ available at the selected URL and its independently associated linked-sites page $30_n$. Again, the initiation of the display of linked-sites pages $30_n$ can be performed by, for example, clicking on hyper-links $50_n$, or buttons $52_n$, and the WWW content $12_n$ and linked-sites page 30 can be provided within a single screen of a web-browser GUI $26_n$—as shown; or, utilising multiple screens, pop-up windows or tabs of a web-browser GUI (not shown).

In yet a further search engine embodiment (not shown), the display of WWW content $12_n$ and linked-sites pages $30_n$ could be initiated by users $24_n$ entering selected URLs directly into a search field 46 provided by the search engine $16_n$ within a web-browser GUI $26_n$ (including a search field provided by way of a browser plug-in, toolbar, etc—not shown).

Figure 6:
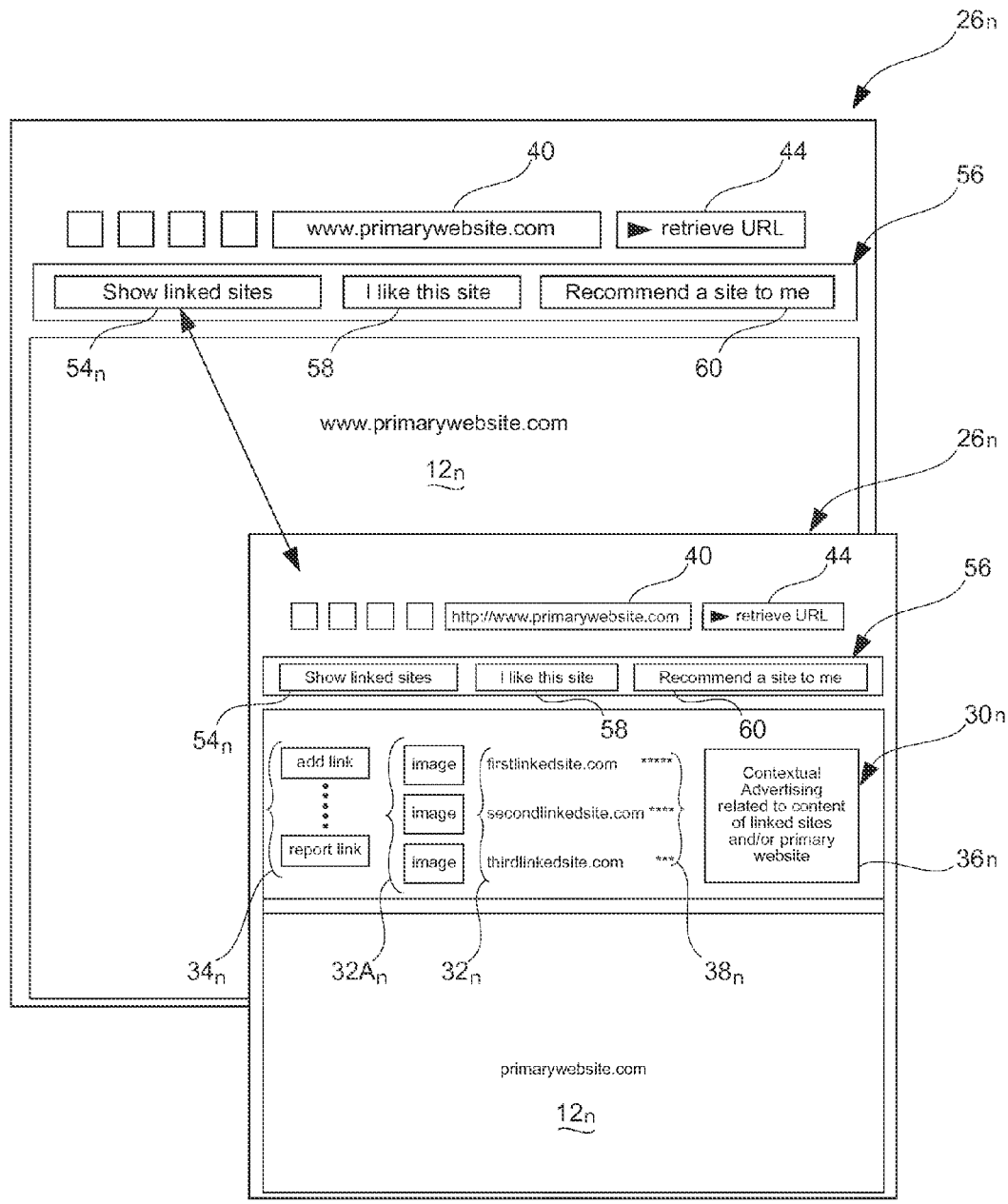
FIG. 6 is an exemplary GUI illustrating yet a further preferred example of the use of the system for linking network content of FIG. 1, wherein it is shown that a web-user is able to view a website and its independently associated linked-content facility within one or more GUI's by the use of a web-browser plug-in, or toolbar, etc, utilising for example, the method for linking network content of FIG. 3; and, FIG. 7 is a block diagram illustrating a further preferred example of the way in which a website and its independently associated linked-content facility may be visually displayed within one or more GUI's.
Figure 7:
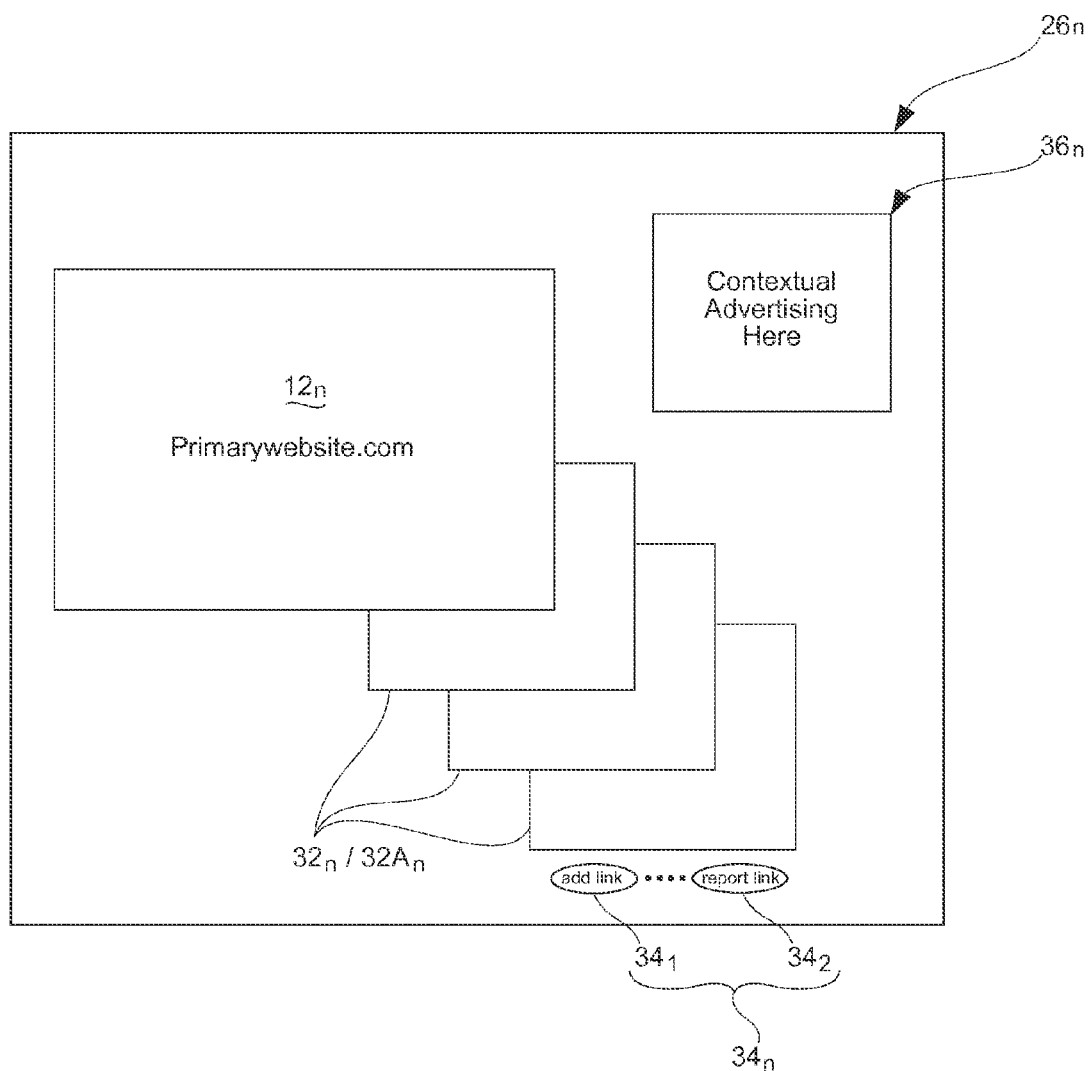

Using a Web-Browser GUI Plug-In or Toolbar:

In FIG. 6 there is shown an exemplary GUI $26_n$, which illustrates a further preferred example of the use of system 10 of FIG. 1. In this example, network server $16_n$ may be a search engine $16_n$, or a dedicated network content linking server $16_n$, and it can be seen that a user $24_n$ is able to (preferably simultaneously) view a website $12_n$ and its independently associated linked-sites page $30_n$ by clicking on a plug-in button $54_n$, provided on a web-browser GUI $26_n$ plug-in or tool bar 56 when a selected website $12_n$ is displayed within web-browser GUI $26_n$. In this way linked-sites pages $30_n$ can be selectively displayed at any time upon a user $24_n$ choosing to click on plug-in button $54_n$. The use of toolbar 56 may minimise the steps required to view a linked-sites page $30_n$.

By utilising a toolbar 56, or the likes, to perform the invention, further preferred aspects of the present invention become possible. For example, toolbar 56 of system 10 of the present invention may include two buttons, or the likes, for activating a 'link recommendation system' which may also be provided by network server $16_n$. A first of these two buttons could be a 'I like this site' button 58 to enable users $24_n$ to flag WWW content $12_n$ they like whilst navigating the Internet $14_n$ (which could then be acquired by network server $16_n$), and a second of these two buttons could be a 'recommend a site to me' button 60 to enable users $24_n$ to retrieve and display random (recommended) WWW content $12_n$ available at a URL determined by network server $16_n$ that is similar to WWW content $12_n$ previously flagged by the user $24_n$ utilising the 'I like this site' button 58 (e.g. a bookmark button).

Similarly, the 'link recommendation system', and/or any other features offered by the browser toolbar 56, and/or any other suitable GUI $26_n$ add-on, of system 10, could then be operated by utilising keyboard 42 'hot-key' commands, and/or, by selecting menu items or buttons (not shown) that become accessible to a user $24_n$ when a GUI pointing device (e.g. a mouse—not shown) is activated in a predetermined manner (e.g. by a right click command, etc).

Although not shown in FIG. 6, it will be appreciated that linked-sites pages $30_n$, may be expanded and/or collapsed utilising any suitable buttons, or menu commands, etc, provided by way of toolbar 56, or within linked-sites pages $30_n$ themselves, depending on a users $24_n$ preference. Similarly, although not shown in FIG. 6, linked-sites pages $30_n$, may be displayed on a separate tab, etc (not shown) provided within a web-browser GUI $26_n$.

These examples therefore demonstrate that system 10 provides users $24_n$, with a novel means of discovering, recommending and/or viewing WWW content $12_n$ related to other WWW content $12_n$ they are interested in and/or are viewing whilst navigating the web $14_n$.

The present invention therefore provides a useful system 10 and/or method 100 for linking network content $12_n$, preferably WWW content $12_n$ accessible via the Internet $14_n$. In accordance with one preferred embodiment of the present invention, WWW content $12_n$ can be selectively and preferably simultaneously displayed side-by-side with independently associated linked-content facilities $30_n$. In accordance with a further, or alternative, preferred embodiment, the linked-content facilities $30_n$ provided by system 10 of the present invention can be selectively displayed beside a list of search results (e.g. WWW content $12_n$ locations or URLs, etc) within a search engine GUI $26_n$ after a search has been performed. In either embodiment, the linked-content facilities $30_n$ provide interactive link $32_n$ recommendation and/or display systems that enable web-users $24_n$ to discover WWW content $12_n$ that is highly likely to be related to other WWW content $12_n$ they are interested in and/or are viewing whilst navigating the web $14_n$ (or performing a search via a search engine, etc). In this way, the efficiency with which web-users $24_n$ can explore and/or search the web $14_n$ is improved by, for example, removing the requirement to switch back and forth between a traditional search result page and/or a website $12_n$ being viewed.

While this invention has been described in connection with specific embodiments thereof, it will be understood that it is capable of further modification(s). The present invention is intended to cover any variations, uses or adaptations of the invention following in general, the principles of the invention and including such departures from the present disclosure as come within known or customary practice within the art to which the invention pertains and as may be applied to the essential features hereinbefore set forth.

Finally, as the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and the appended claims. Therefore, the specific embodiments are to be understood to be illustrative of the many ways in which the principles of the present invention may be practiced.

The invention claimed is:

1. A method for displaying or providing links to related network content, said method comprising the steps of:

providing at least one network server which generates, stores or maintains a plurality of linked-content facilities, each of said linked-content facilities being paired with a specific network location that contains network content that is independent of said at least one network server; providing at least one user operable terminal with controlled access to said at least one network server and said linked-content facilities stored thereon; receiving and processing at said at least one network server a request sent from said at least one user operable terminal, via a communications network, to view or acquire a linked-content facility for a selected network location; and, displaying or providing said linked-content facility on or to said at least one user operable terminal for the selected network location; wherein said linked-content facilities include links to other network content, available at other network locations, deemed to be related to the network content available at the respective paired network locations, said links being independent of any links provided in the network content available at the respective paired network locations; and wherein said links include system generated links and said method further comprises the steps of: acquiring or generating said system generated links for display within a said linked-content facility utilizing at least one of the following methods: (i) evaluating the network content available at the respective network location paired with said linked-content facility; crawling or perusing said communications network in order to locate said other network locations containing said other or related network content; and, adding links to said linked-content facility to each of said other network locations that were discovered; (ii) acquiring tag or note information, meta-tag data or images associated with the network content available at the respective network location paired with said linked-content facility; utilizing the acquired tag or note information, meta-tag data or images to locate said other network locations having the same or similar tag or note information, meta-tag data or images associated therewith; and, adding links to said linked-content facility to each of said other network locations that were discovered; or, (iii) evaluating the network content available at the respective network location paired with said linked-content facility; utilizing a network search facility to locate said other network locations containing said other or related network content; and, adding links to said linked-content facility to each of said other network locations that were discovered.

2. The method as claimed in claim 1, wherein said linked-content facilities stored or maintained on said at least one network server further include user generated links received from at least one user of said at least one user operable terminal.

3. The method as claimed in claim 2, further comprising the steps of: receiving at least one user generated link from said at least one of said user operable terminal, via at least one of said linked-content facilities; storing said at least one user generated link on said at least one network server; selectively updating said at least one of said linked-content facilities with said at least one user generated link relevant thereto; and, making said updated linked-content facilities available to all of said user operable terminals; wherein said at least one user generated link, or said system generated link or links, enables said users of said at least one user operable terminals to discover, recommend or view other network content deemed to be related to the network content they are interested in or are viewing whilst navigating said communications network.

4. The method as claimed in claim 2, wherein said step of acquiring or generating system generated links for display within a said linked-content facility further includes utilizing at least one of the following methods: evaluating existing user generated link content deemed to be related to the network content available at the respective network location paired with said linked-content facility; utilizing the existing user generated link content to locate said other network locations containing other or related network content; and, adding links to said linked-content facility to each of said other network locations that were discovered; or, acquiring predetermined user preferences regarding network content or topics of interest to said user; utilizing the acquired predetermined user preferences to locate said other network locations having network content deemed to be related to the network content or topics of interest to said user; and, adding links to said linked-content facility to each of said other network locations that were discovered.

5. The method as claimed in claim 2, wherein said at least one network server is at least one computing device which includes at least one processor which is operable to execute software that maintains and controls access to said linked-content facilities for said at least one user operable terminal.

6. The method as claimed in claim 5, wherein said at least one computing device is a web-server accessible to said at least one user operable terminal via said communications network, wherein said at least one user can access said web-server via at least one software application installed on said at least one user operable terminal which may be permanently, or selectively, connected to said communications network.

7. The method as claimed in claim 6, wherein said communications network is the Internet or a mobile phone network, and said network content is WWW content, and each of said linked-content facilities are paired with a specific network location containing said WWW content.

8. The method as claimed in claim 7, wherein said network location is a URL containing said WWW content.

9. The method as claimed in claim 1, wherein said at least one user operable terminal is selected from the group consisting of: a PDA; a mobile, cellular or smart telephone; a personal, tablet or notebook computer; or, any other suitable computing or communications device.

10. The method as claimed in claim 8, further including the steps of: querying said Internet or mobile phone network at predetermined intervals to locate available URLs containing WWW content, or, receiving URLs from web-users wishing to view linked-content facilities for selected URLs; acquiring and storing at least selected ones of said URLs in at least one repository associated with said web-server; and, generating a linked-content facility for each of said URLs stored in said at least one repository.

11. The method as claimed in claim 10, wherein said web-server is a search engine and said at least one software application installed on said at least one user operable terminal is a web-browser GUI or a mobile phone GUI.

12. The method as claimed in claim 11, wherein said request sent from said at least one user operable terminal to said search engine, via said Internet or mobile phone network, to view or acquire a linked-content facility for a selected URL is accomplished by said web-users clicking on, or hovering over, hyper-links or buttons displayed within said web-browser or mobile phone GUI that are associated with respective ones of a list of URLs, or other details pertaining thereto, containing WWW content that are displayed after a search has been performed.

13. The method as claimed in claim 12, further including the step of: displaying at least one of said linked-content facilities beside a respective one of said URLs contained within said list of URLs that are displayed after a search has been performed.

14. The method as claimed in claim 12, further including the step of: for a selected one of said URLs contained within said list of URLs, simultaneously displaying said WWW content available at said URL, and its linked-content facility paired therewith: utilizing a single screen of said web-browser or mobile phone GUI; or, utilizing multiple screens, pop-up windows or tabs of said web-browser or mobile phone GUI.

15. The method as claimed in claim 11, wherein said request sent from said at least one user operable terminal to said search engine, via said Internet or mobile phone network, to view or acquire a linked-content facility for a selected URL is accomplished by said web-users entering said selected URL directly into any suitable search field provided by said search engine within said web-browser or mobile phone GUI.

16. The method as claimed in claim 15, further including the step of: simultaneously displaying said WWW content available at said selected URL, and its linked-content facility paired therewith: utilizing a single screen of said web-browser or mobile phone GUI; or, utilizing multiple screens, pop-up windows or tabs of said web-browser or mobile phone GUI.

17. The method as claimed in claim 10, wherein said web-server is a dedicated network content linking server which can be used by said web-users to display said WWW content and said linked-content facilities paired therewith.

18. The method as claimed in claim 17, wherein said at least one software application installed on said at least one user operable terminal is a web-browser GUI or a mobile phone GUI.

19. The method as claimed in claim 18, wherein said request sent from said at least one user operable terminal to said dedicated network content linking server, via said Internet or mobile phone network, is accomplished by said web-users: entering a selected URL directly into a URL or search field built into said web-browser or mobile phone GUI; entering a selected URL into a search or retrieve URL field provided on a website displayed within said web-browser or mobile phone GUI; or, selecting a selected URL from a list of favorites or bookmarks accessible to said web-browser or mobile phone GUI.

20. The method as claimed in claim 19, wherein after sending said request to said dedicated network content linking server, said web-browser or mobile phone GUI simultaneously displays said WWW content and its linked-content facility paired therewith: utilizing a single screen of said web-browser or mobile phone GUI; or, utilizing multiple screens, pop-up windows or tabs of said web-browser or mobile phone GUI.

21. The method as claimed in claim 7, wherein when said at least one user chooses to view or acquire WWW content available at a link provided within a particular linked-content facility, or a link to other WWW content provided within the WWW content itself, that WWW content is then displayed within at least one GUI along with the linked-content facility paired therewith.

22. The method as claimed in claim 21, wherein when said at least one user clicks on a link provided within a linked-content facility, or within the WWW content initially displayed, the WWW content available at that link is displayed, and at around the same time the linked-content facility dynamically updates to display the linked-content facility for the WWW content then being displayed.

23. The method as claimed in claim 8, wherein said link-content facilities also include/display: images or thumbnails representing the WWW content available at respective URLs; or, tag or note information related to the WWW content available at respective URLs.

24. A system for displaying or providing links to related network content, said system being operable over a communications network, said system comprising:

at least one memory or storage unit operable to store or maintain a plurality of linked-content facilities, each of said linked-content facilities being paired with a specific network location that contains network content that is independent of said at least one memory or storage unit; at least one processor operable to execute software that generates, maintains or controls access to said linked-content facilities for a plurality of users; and, at least one input or output device operable to provide an interface for said plurality of users to operate said software in order to retrieve or view said linked-content facilities from said at least one memory or storage unit, via said communications network, for selected network locations; wherein said linked-content facilities include links to other network content, available at other network locations, deemed to be related to the network content available at the respective paired network locations, said links being independent of any links provided in the network content available at the respective paired network locations; and wherein said links include system generated links which are acquired or generated for display within a said linked-content facility utilizing at least one of the following methods: (i) evaluating the network content available at the respective network location paired with said linked-content facility; crawling or perusing said communications network in order to locate said other network locations containing said other or related network content; and, adding links to said linked-content facility to each of said other network locations that were discovered; (ii) acquiring tag or note information, meta-tag data or images associated with the network content available at the respective network location paired with said linked-content facility; utilizing the acquired tag or note information, meta-tag data or images to locate said other network locations having the same or similar tag or note information, meta-tag data or images associated therewith; and, adding links to said linked-content facility to each of said other network locations that were discovered; or, (iii) evaluating the network content available at the respective network location paired with said linked-content facility; utilizing a network search facility to locate said other network locations containing said other or related network content; and, adding links to said linked-content facility to each of said other network locations that were discovered.

25. The system as claimed in claim 24, wherein said system includes at least one computing device having said at least one processor and said at least one memory or storage unit associated therewith, and wherein said at least one computing device is a network server connected to said communications network.

26. The system as claimed in claim 25, wherein said network server is a web-server accessible to said plurality of users via said communications network, and wherein said communications network is the Internet or a mobile phone network.

27. The system as claimed in claim 26, wherein said at least one input or output device is associated with at least one user operable terminal, wherein each of said plurality of users can access said linked-content facilities stored or maintained on said web-server via at least one software application installed on said at least one user operable terminal which may be permanently, or selectively, connected to said Internet or mobile phone network.

28. The system as claimed in claim 27, wherein said at least one user operable terminal is selected from the group consisting of: a PDA; a mobile telephone; a cellular telephone; a smart telephone; a personal computer; a tablet computer; a notebook computer; and another suitable computing or communications device.

29. The system as claimed in claim 26, wherein said network content is WWW content and each of said linked-content facilities are paired with a specific network location.

30. The system as claimed in claim 29, wherein said network location is a URL containing said WWW content.

31. The system as claimed in claim 30, wherein said linked-content facilities can be selectively displayed beside a list of URLs, or other details pertaining thereto, provided within a search engine GUI after an Internet or mobile phone network search has been performed.

32. The system as claimed in claim 30, wherein for any selected URL, said WWW content and its linked-content facility paired therewith can be selectively and simultaneously displayed within at least one GUI.

33. The system as claimed in claim 30, wherein when a user chooses to view or acquire WWW content available at a link provided within a particular linked-content facility, or a link to other WWW content provided within the WWW content itself, that WWW content is then displayed within at least one GUI along with the linked-content facility paired therewith.

34. The system as claimed in claim 33, wherein when said user clicks on a link provided within a linked-content facility, or within the WWW content initially displayed, the WWW content available at that link is displayed, and at around the same time the linked-content facility dynamically updates to display the linked-content facility for the WWW content then being viewed.

35. A method for displaying or providing links to related WWW content via the Internet or a mobile phone network, said method comprising the steps of:
acquiring details pertaining to network locations containing WWW content; generating and pairing an independent linked-content facility with each of said network locations for which details were acquired; and, selectively making said linked-content facilities available to WWW users upon request to enable them to discover, recommend or view other WWW content deemed to be related to WWW content they are interested in or are viewing whilst navigating the Internet or mobile phone network; wherein said linked-content facilities include links to said other WWW content, available at other network locations, deemed to be related to the WWW content available at the respective paired network locations, said links being independent of any links provided in the WWW content available at the respected paired network locations; and wherein said links include system generated links which are acquired or generated for display within a said linked-content facility utilizing at least one of the following methods: (i) evaluating the WWW content available at the respective network location paired with said linked-content facility; crawling or perusing said communications network in order to locate said other network locations containing said other or related WWW content; and, adding links to said linked-content facility to each of said other network locations that were discovered; (ii) acquiring tag or note information, meta-tag data or images associated with the WWW content available at the respective network location paired with said linked-content facility; utilizing the acquired tag or note information, meta-tag data or images to locate said other network locations having the same or similar tag or note information, meta-tag data or images associated therewith; and, adding links to said linked-content facility to each of said other network locations that were discovered; or, (iii) evaluating the WWW content available at the respective network location paired with said linked-content facility; utilizing a network search facility to locate said other network locations containing said other or related WWW content; and, adding links to said linked-content facility to each of said other network locations that were discovered.

36. The method as claimed in claim 35, wherein said network locations are URLs that specify the addresses of said WWW content, and wherein said step of acquiring details pertaining to URLs containing WWW content includes the step of querying said Internet or mobile phone network at predetermined intervals to locate details of at least selected one of the available URLs or acquiring URLs details from said WWW users upon receiving requests to view linked-content facilities for selected URLs.

37. The method as claimed in claim 36, wherein said linked-content facilities further include user generated links received from at least one of said WWW users.

38. The method as claimed in claim 37, further including the step of: displaying at least one of said linked-content facilities beside a list of URLs, or other details pertaining thereto, provided within a search engine GUI after an Internet or mobile phone network search has been performed.

39. The method as claimed in claim 37, further including the step of: for any selected URL, simultaneously displaying said WWW content and its linked-content facility paired therewith within at least one GUI.

40. The method as claimed in claim 8, wherein said linked-content facilities provide a visual map representing the relationship between the system or user generated links and the WWW content available at the respective URLs paired therewith.

41. The method as claimed in claim 38, wherein when a WWW user chooses to view or acquire WWW content available at a link provided within a particular linked-content facility, or a link to other WWW content provided within the WWW content itself, that WWW content is then displayed within at least one GUI along with the linked-content facility paired therewith.

42. The method as claimed in claim 39, wherein when a WWW user chooses to view or acquire WWW content available at a link provided within a particular linked-content facility, or a link to other WWW content provided within the WWW content itself, that WWW content is then displayed within at least one GUI along with the linked-content facility paired therewith.

43. The system as claimed in claim 27, wherein said linked-content facilities stored or maintained on said at least one memory or storage unit further include user generated links received from at least one user of said at least one user operable terminal.

44. The system as claimed in claim 43, wherein said links further include system generated links which are acquired or generated for display within a said linked-content facility utilizing at least one of the following methods: evaluating existing user generated link content deemed to be related to the network content available at the respective network location paired with said linked-content facility; utilizing the existing user generated link content to locate said other network locations containing other or related network content; and, adding links to said linked-content facility to each of said other network locations that were discovered; or, acquiring predetermined user preferences regarding network content or topics of interest to said user; utilizing the acquired predetermined user preferences to locate said other network locations having network content deemed to be related to the network content or topics of interest to said user; and, adding links to said linked-content facility to each of said other network locations that were discovered.

45. The method as claimed in claim 37, wherein said step of acquiring or generating system generated links for display within a said linked-content facility further includes utilizing at least one of the following methods: evaluating existing user generated link content deemed to be related to the WWW content available at the respective network location paired with said linked-content facility; utilizing the existing user generated link content to locate said other network locations containing other or related WWW content; and, adding links to said linked-content facility to each of said other WWW locations that were discovered; or, acquiring predetermined user preferences regarding WWW content or topics of interest to said WWW user; utilizing the acquired predetermined user preferences to locate said other network locations having WWW content deemed to be related to the WWW content or topics of interest to said WWW user; and, adding links to said linked-content facility to each of said other network locations that were discovered.

* * * * *